(12) United States Patent
Vause et al.

(10) Patent No.: US 12,393,184 B2
(45) Date of Patent: Aug. 19, 2025

(54) INDUSTRIAL PROCESS CONTROL USING UNSTRUCTURED DATA

(71) Applicant: Phaidra, Inc., Seattle, WA (US)

(72) Inventors: Christopher R. Vause, Austin, TX (US); Cagdas Alcicek, Seattle, WA (US); Priyam Agarwal, Seattle, WA (US); Katherine Elizabeth Hoffman, Silverdale, WA (US); Vedavyas Panneershelvam, Burnaby (CA)

(73) Assignee: Phaidra, Inc., Seattle, WA (US)

( * ) Notice: Subject to any disclaimer, the term of this patent is extended or adjusted under 35 U.S.C. 154(b) by 0 days.

(21) Appl. No.: 18/732,128

(22) Filed: Jun. 3, 2024

(65) Prior Publication Data

US 2024/0402693 A1 Dec. 5, 2024

Related U.S. Application Data

(60) Provisional application No. 63/470,555, filed on Jun. 2, 2023.

(51) Int. Cl.
*G05B 19/418* (2006.01)
(52) U.S. Cl.
CPC ... *G05B 19/41885* (2013.01); *G05B 19/4183* (2013.01); *G05B 19/41845* (2013.01)
(58) Field of Classification Search
CPC .......... G05B 19/41885; G05B 19/4183; G05B 19/41845
See application file for complete search history.

(56) References Cited

U.S. PATENT DOCUMENTS

| | | | |
|---|---|---|---|
| 3,593,744 A | 7/1971 | Smith | |
| 3,786,922 A | 1/1974 | Materese | |
| 3,944,770 A | 3/1976 | Pepper | |
| 4,628,435 A | 12/1986 | Tashiro et al. | |
| 5,711,483 A | 1/1998 | Hays | |
| 6,053,703 A | 4/2000 | Kawaguchi et al. | |
| 10,311,507 B2 | 6/2019 | Stausholm et al. | |
| 11,762,371 B1 * | 9/2023 | SayyarRodsari .. | G05B 19/4155 700/28 |
| 11,868,098 B2 | 1/2024 | Gao et al. | |
| 2002/0038336 A1 | 3/2002 | Abileah et al. | |

(Continued)

FOREIGN PATENT DOCUMENTS

KR 20180115146 A 10/2018

OTHER PUBLICATIONS

Luo, et al., "Controlling Commercial Cooling Systems Using Reinforcement Learning", DeepMind, Dec. 15, 2022, arXiv:2211.07357v2.

(Continued)

*Primary Examiner* — Christopher E. Everett
(74) *Attorney, Agent, or Firm* — Jeffrey Schox; Diana Lin

(57) ABSTRACT

In variants, a method for industrial process control can include: determining an industrial system representation using a set of industrial system templates, wherein each template is associated with a control model and a set of attributes corresponding to control model features; determining associations between the attributes of the industrial system representation and data streams from the industrial system; and generating a set of control instructions for the industrial system based on the data streams associated with the attributes.

20 Claims, 15 Drawing Sheets

(56) References Cited

U.S. PATENT DOCUMENTS

| | | | |
|---|---|---|---|
| 2002/0046294 A1 | 4/2002 | Brodsky et al. | |
| 2003/0171851 A1 | 9/2003 | Brickfield et al. | |
| 2004/0049295 A1 | 3/2004 | Wojsznis et al. | |
| 2005/0137727 A1 | 6/2005 | Feuerbach et al. | |
| 2007/0059838 A1 | 3/2007 | Morrison et al. | |
| 2008/0003120 A1 | 1/2008 | Meza | |
| 2008/0082302 A1 | 4/2008 | Samardzija et al. | |
| 2008/0319936 A1 | 12/2008 | Wong et al. | |
| 2012/0053909 A1* | 3/2012 | Forbes | G05B 17/02 703/2 |
| 2013/0066471 A1 | 3/2013 | Wang et al. | |
| 2016/0025360 A1 | 1/2016 | West et al. | |
| 2016/0098037 A1 | 4/2016 | Zornio et al. | |
| 2016/0163179 A1 | 6/2016 | Matsumoto et al. | |
| 2016/0274552 A1* | 9/2016 | Strohmenger | G06Q 10/06 |
| 2016/0281607 A1 | 9/2016 | Asati et al. | |
| 2016/0357886 A1 | 12/2016 | Fralick et al. | |
| 2017/0102693 A1 | 4/2017 | Kidd et al. | |
| 2017/0132553 A1 | 5/2017 | Theirl et al. | |
| 2017/0205815 A1 | 7/2017 | Wegner et al. | |
| 2018/0052451 A1* | 2/2018 | Billi-Duran | G05B 19/41835 |
| 2018/0063244 A1 | 3/2018 | Maturana et al. | |
| 2018/0279636 A1 | 10/2018 | Poos | |
| 2018/0364654 A1 | 12/2018 | Locke et al. | |
| 2019/0030544 A1 | 1/2019 | Kratzer et al. | |
| 2019/0102360 A1* | 4/2019 | Sayyar | G05B 23/0221 |
| 2019/0129395 A1 | 5/2019 | Niemiec et al. | |
| 2019/0361412 A1 | 11/2019 | Park et al. | |
| 2020/0233384 A1 | 7/2020 | Iwane | |
| 2020/0265329 A1* | 8/2020 | Thomsen | G06N 20/10 |
| 2020/0310394 A1* | 10/2020 | Wouhaybi | H04L 67/1051 |
| 2020/0326684 A1* | 10/2020 | Chand | G05B 23/024 |
| 2020/0379452 A1 | 12/2020 | Yamaguchi et al. | |
| 2020/0380447 A1 | 12/2020 | Wang et al. | |
| 2020/0387818 A1* | 12/2020 | Chan | G06F 17/18 |
| 2021/0096541 A1* | 4/2021 | Sayyarrodsari | H04W 4/38 |
| 2021/0096551 A1* | 4/2021 | Sayyarrodsari | G06Q 10/06395 |
| 2021/0197275 A1 | 7/2021 | Sohn et al. | |
| 2021/0278957 A1 | 9/2021 | Canneto et al. | |
| 2021/0307210 A1 | 9/2021 | Wong et al. | |
| 2021/0365840 A1 | 11/2021 | Park et al. | |
| 2021/0379552 A1 | 12/2021 | Shimoni et al. | |
| 2021/0397166 A1* | 12/2021 | Sayyarrodsari | G06F 8/30 |
| 2022/0308533 A1* | 9/2022 | Robert | G05B 19/41875 |
| 2022/0373206 A1 | 11/2022 | Tillack | |
| 2023/0003418 A1 | 1/2023 | Utt | |
| 2023/0280723 A1* | 9/2023 | Thomsen | G05B 19/41875 700/28 |
| 2023/0412696 A1* | 12/2023 | Sandler | H04L 69/08 |
| 2024/0103852 A1* | 3/2024 | Pierce | G05B 19/0426 |

OTHER PUBLICATIONS

"A new approach to process optimization", Imubit, first downloaded Jun. 2, 2023, https://imubit.com/deep-learning-process-control-platform-for-hydrocarbon-processors/.

"DeepMind AI Reduces Google Data Centre Cooling Bill by 40%", Jul. 20, 2016, https://www.deepmind.com/blog/deepmind-ai-reduces-google-data-centre-cooling-bill-by-40.

"Safety-first AI for autonomous data centre cooling and industrial control", https://www.deepmind.com/blog/safety-first-ai-for-autonomous-data-centre-cooling-and-industrial-control, Aug. 17, 2018.

Alanne, Kari, et al., "An overview of machine learning applications for smart buildings", Sustainable Cities and Society, vol. 76, Jan. 2022, 103445.

Gao, Jim, "AI assistance for plant operators", Phaidra, downloaded Dec. 22, 2022.

Gao, Jim, "Machine Learning Applications for Data Center Optimization", Google (2014), https://static.googleusercontent.com/media/research.google.com/en//pubs/archive/42542.pdf.

Silver, David, et al., "Mastering the game of Go with deep neural networks and tree search", Nature, vol. 529, Jan. 28, 2016.

* cited by examiner

| Industrial system$_{instance1}$ | North Carolina West Campus | |
|---|---|---|
| Selected template elements | Name | Data stream ID |
| Bioreactor manufacturing site | Manufacturing site A | |
| Power | Mfg site A power output | Col header: overall_power_outputA |
| Output | Mfg site A biomass output | Col header: output_massA |
| Bioreactor | Bioreactor north | |
| Flow rate | North flow rate | Col header: YT-103 9r2938-di... |
| Media tempearture | North media T | endpoint: monitoringprogram.t50.... |
| Bioreactor | Bioreactor east | |
| Flow rate | East flow rate | Col header: YT-103 8eig39i... |
| Media tempearture | East media T | endpoint: monitoringprogram.t38.... |
| Media Pressure | East media P | endpoint: monitoringprogram.p03.... |
| Impeller | | |
| Rotation rate | Bioreactor east impeller 1 rate | https://api.sola... |

FIGURE 4

INDUSTRIAL PROCESS CONTROL USING UNSTRUCTURED DATA

CROSS-REFERENCE TO RELATED APPLICATIONS

This application claims the benefit of U.S. Provisional Application No. 63/470,555 filed 2 Jun. 2023, which is incorporated in its entirety by this reference.

TECHNICAL FIELD

This invention relates generally to the industrial process control field, and more specifically to new and useful systems and/or methods for industrial process control using unstructured data fields.

BACKGROUND

Machine-learning based industrial process control methods oftentimes benefit from structured data. Unfortunately, industrial process data is unstructured by default—the data lacks a taxonomy, and the ontology is oftentimes specific to the industrial process system (e.g., the plant, the data center, etc.).

Conventional systems attempt to resolve this issue by enabling users to define and assign attributes to their industrial system data in a free-form manner. While easy for users, this can create several issues. First, conventional systems cannot treat attributes assigned by different users in the same manner, because users may attach different meanings to the same attribute when performing the mapping. Second, because the attributes are defined ad hoc without strict definitions or relationships, conventional systems need to develop custom models end-to-end for each new industrial system instance. For example, the conventional systems need to: learn the important attributes for the custom model, learn the constraints for the custom model, train the custom model, test the custom model, and validate the custom model; each step increasing the time it takes to deploy the model on the industrial system. Third, conventional systems are prone to error due to bad or incorrect mapping-because the attributes are defined and assigned ad hoc without a source of truth, there is no way to ensure that the data being used is clean or complete.

Thus, there is a need in the industrial process control field to create new and useful systems and/or methods for structuring unstructured industrial system data in the industrial process control field.

BRIEF DESCRIPTION OF THE FIGURES

FIG. 4 is a schematic representation of a filled-out template for an industrial system instance.

DETAILED DESCRIPTION

The following description of the embodiments of the invention is not intended to limit the invention to these embodiments, but rather to enable any person skilled in the art to make and use this invention.

1. Overview

Figure 1:
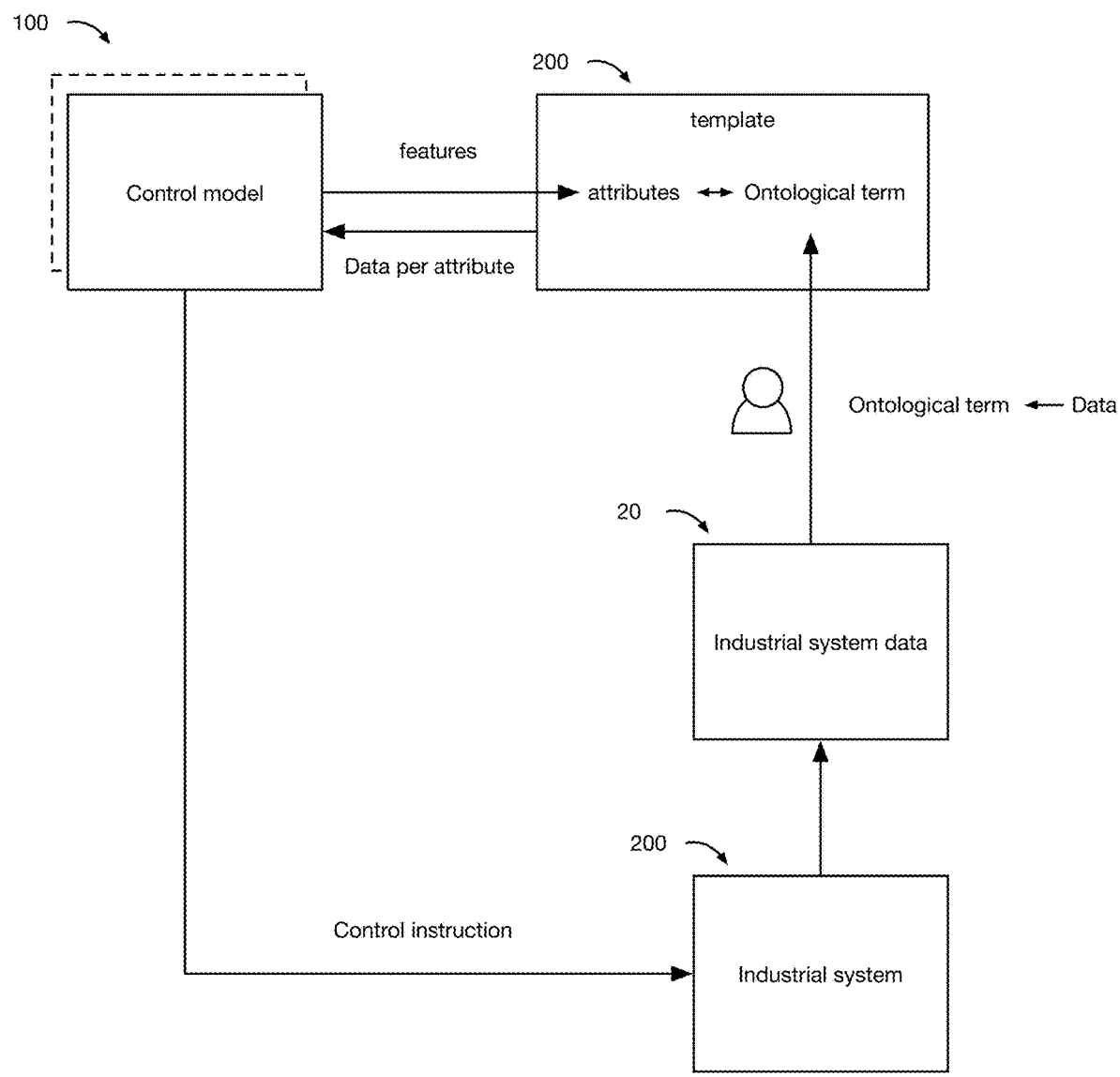
FIG. 1 is a schematic representation of a variant of system usage.

In variants, the system for industrial process control can include: a set of control models 100 for each of a set of industrial system types; and templates 200 used to represent an industrial system (e.g., example shown in FIG. 1). In variants, the method for industrial process control can include: determining an industrial system representation S100; determining associations between the attributes of the industrial system representation and data streams from the industrial system S200; and generating a set of control instructions for the industrial system based on the data streams associated with the attributes S300 (e.g., example shown in FIG. 12). The system and method function to normalize industrial process data into a standard taxonomy and ontology, such that control models can be systematically, repeatably, and reliably applied to the industrial process data for automated control instruction determination.

In an illustrative example, the system can include: a set of industrial system templates for each of a set of industrial system types and a set of machine learning control models for each of said set of industrial system types (e.g., example shown in FIG. 1). The templates can each include a predefined set of attributes 220 (e.g., components, tags, etc.) specific to the industrial system type (e.g., example shown in FIG. 3). The attributes 220 in a template can include both required attributes and contextual attributes for the industrial system type. All or a subset of the attributes 220 can be determined based on the control model for the industrial system type. For example, the required attributes can be associated with (e.g., are determined from, are equivalent to) the machine learning features used by the machine learning control model for the respective industrial system type (e.g., example shown in FIG. 2), wherein the machine learning features can be determined using lift analyses, explainability methods, feature engineering, and/or otherwise determined. In this example, the attributes can also include a set of constraints, which can be predetermined for the industrial system type, or manually specified. Each attribute can also be pre-associated with a set of data health modules (e.g., for validating the data), imputation modules (e.g., for cleaning or completing the data), and/or other processing modules. In use, the user associates (e.g., "maps") their industrial system 10 data streams 20 to the template's attributes (e.g., instead of assigning ad hoc, undefined attributes to a data stream) (e.g., example shown in FIG. 1), which inherently structures the data and enables the system to directly map the data streams to the ML features.

In an illustrative example, the method can include: determining a control model for an industrial system type; selecting features for the control model (e.g., using machine learning feature selection methods); and associating the control model and the features with a template for the industrial system type. In variants, when the template is selected for a subsequent industrial system, features from the selected set of features (e.g., only the selected features) can be mapped to data streams from the subsequent industrial system, wherein the mapped data are used as model inputs by the control model (e.g., example shown in FIG. 13). In variants, data from unmapped data streams (e.g., data streams unassociated with attributes) are not used for control instruction determination by the control model.

3. Technical Advantages

Variants of the technology can confer one or more advantages over conventional technologies.

First, variants of the technology can cut down deployment time by using attribute templates ("tags") that were determined based on features from the respective industrial system type's control model. In particular, mapping data to the model-derived template can reduce or eliminate the feature engineering stage, the constraint learning stage, the training stage, and/or the testing stage that were previously required by conventional systems, since the attribute-to-model-feature mapping is predetermined. For example, instead of individually determining a custom set of machine learning features for each industrial system, this technology can eliminate the feature selection steps by predetermining the fundamental set of machine learning features for each industrial system using the template, and by predetermining which data streams ("attributes", "tags") are required to generate the values for the set of fundamental machine learning features. Once a new industrial system's data streams are mapped to the template-required data streams (attributes), the system can automatically generate the machine learning feature values for the set of fundamental ML features, and immediately begin generating useful control instructions for the new industrial system, thereby bypassing the feature selection step altogether. This can decrease the amount of computational resources and the amount of time required to deploy a control model for a new industrial system instance, since the aforementioned stages can be shortened or eliminated altogether.

Figure 13:
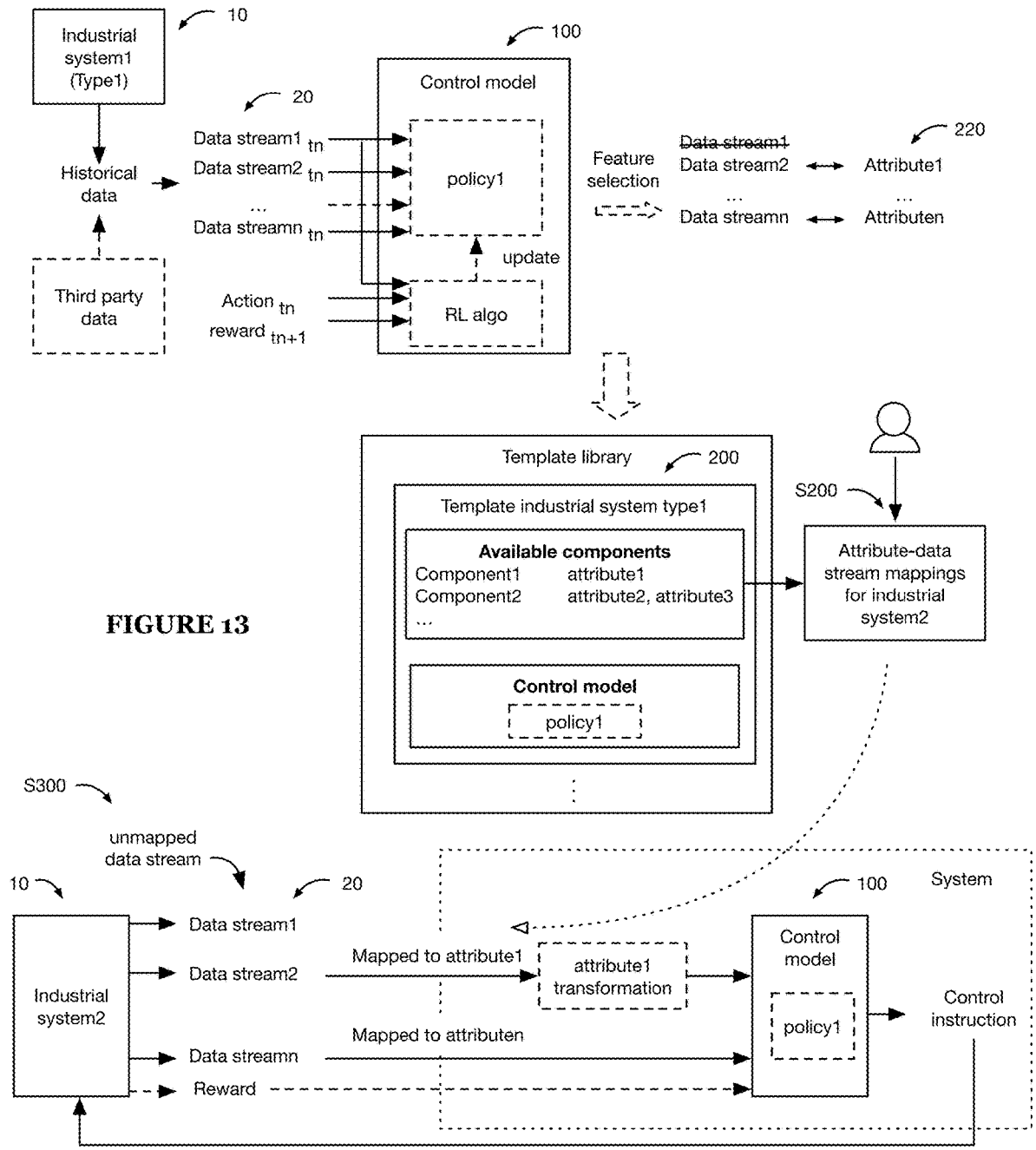
FIG. 13 is an illustrative example of template creation, attribute-data stream mapping, and control instruction determination using the template and attribute-data stream mapping.

Furthermore, since the important machine learning features are predetermined, in some variants of the technology, not all data streams generated by the industrial system (e.g., only a subset of the industrial system's data streams) are used to train the control model or used by the control model to determine the control instructions (e.g., example shown in FIG. 13). This can reduce the amount of overall data that is transmitted from the industrial system, which can decrease data transfer latency, decrease required bandwidth, and decrease the amount of memory needed to store the data. This can also increase data security, since less data is being exposed by the industrial system. This can also decrease the model latency, since less data is being ingested and processed by the upstream layers of the model. However, in alternative variants, all data streams can be ingested by the system (e.g., transmitted from the industrial system), but only a subset used by the model; or all data streams can be used by the model.

Second, variants of the technology can enable control models (or aspects thereof, such as hyperparameters) to be reused across different industrial system instances by using model-derived templates, since the attribute-feature mapping across the different industrial system instances will all be normalized and consistent (e.g., the same). For example, a single cooling center model can be reused across many different cooling centers (e.g., instead of training a custom model for each cooling center) since the cooling center's model features will be consistently mapped to the correct data. This, in turn, enables the models to be more robust, more extensively validated, more extensively tested, precertified, and/or more rapidly deployed (e.g., a standard model for the industrial system type can be tuned for the industrial system instance, instead of training a new model end-to-end).

Third, variants of the technology can automatically create the control model for a new industrial system instance with little or no manual intervention. For example, a new industrial system instance can be represented as a hierarchical graph of components or component groups, wherein each component or component group can be associated with a predetermined component control model and wherein the hierarchical relationships can be predetermined or manually specified. The control model for the industrial system can be determined by aggregating the component control models based on the component relationships determined based on the hierarchical graph. In another example, the control model for the industrial system can be automatically learned by searching for relationships between the predetermined attributes (e.g., predetermined ML features) associated with each component and an output variable (e.g., the optimized industrial system metric), given the component relationships defined by the component graph. In this example, the control model can be an objective function, a policy, an acquisition function, and/or other model. In another example, the system can automatically train a machine-learning based control model (e.g., generated by a reinforcement learning agent) for the new industrial system instance, based on historical data from data streams mapped to the component attributes. However, the technology can otherwise automatically create a control model for the new industrial system instance.

Fourth, in variants of the technology, each attribute can be associated with its own set of data health rules, data cleaning rules (e.g., imputation rules), data transforms, permitted or required constraints, permitted or required setpoints, and/or controllable elements. This can reduce error when setting up the control model. For example, if the data stream attribute mapping is incorrect, the attribute's data health rules will emit a failure event (e.g., because it was expecting a different data stream or data type), which can readily flag incorrect data mappings and/or other user errors before model training and/or deployment. In another example, if the data stream includes segments of data that fail the data health rules, the system can automatically impute data to replace the failed data segment, which can enable the control model to be trained or used for control.

However, further advantages can be provided by the system and method disclosed herein.

4. System

In variants, the system for industrial process control can include: a set of control models for each of a set of industrial system types; and a set of industrial system templates for each of the set of industrial system types. The system functions to normalize industrial process data into a standard taxonomy and ontology, such that control models can be systematically, repeatably, and reliably applied to the industrial process data for automated control instruction determination.

Figure 8A:
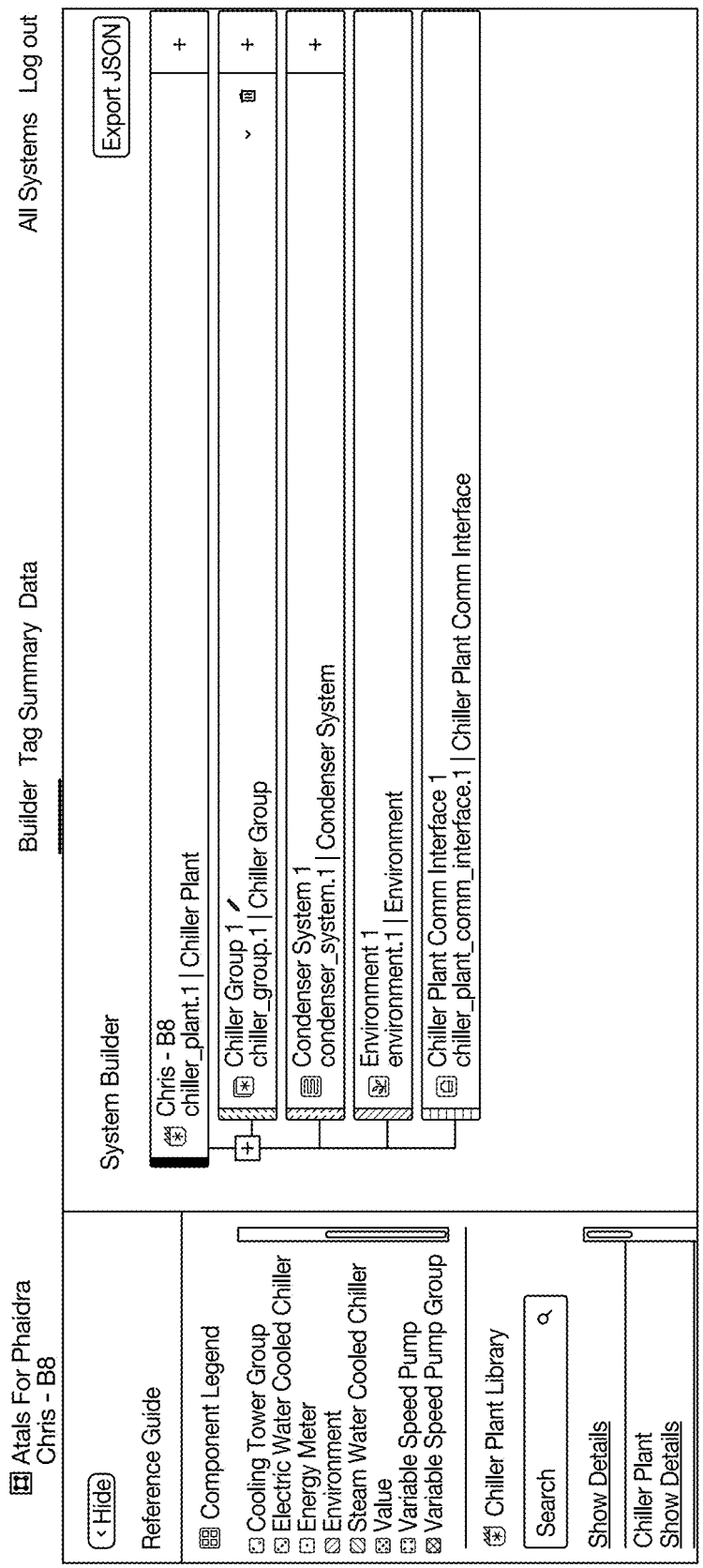
FIGS. 8A and 8B are illustrative examples of an interface for filling out a template for an industrial system instance, including a hierarchical series of components.
Figure 8B:
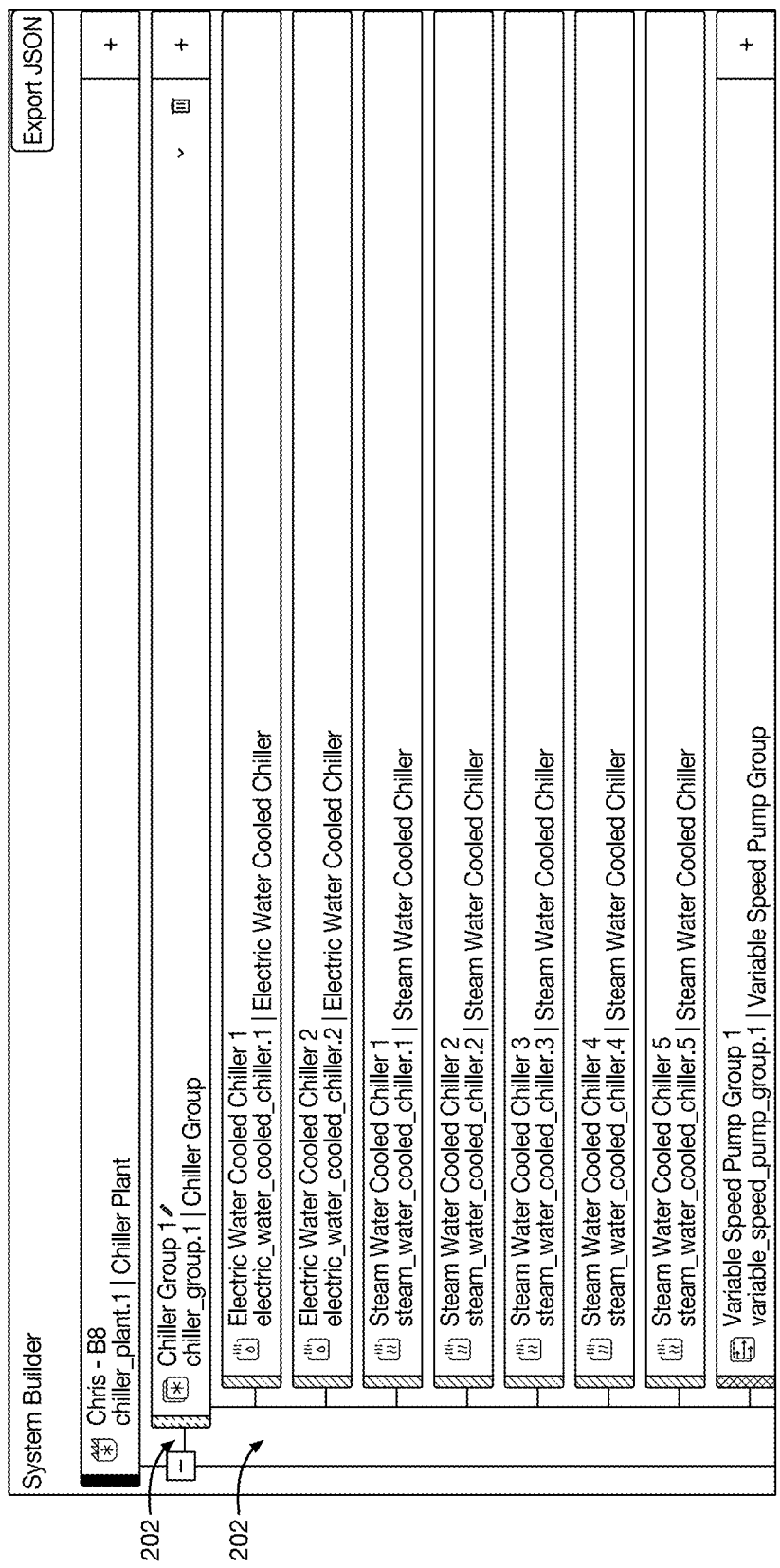
Figure 9A:
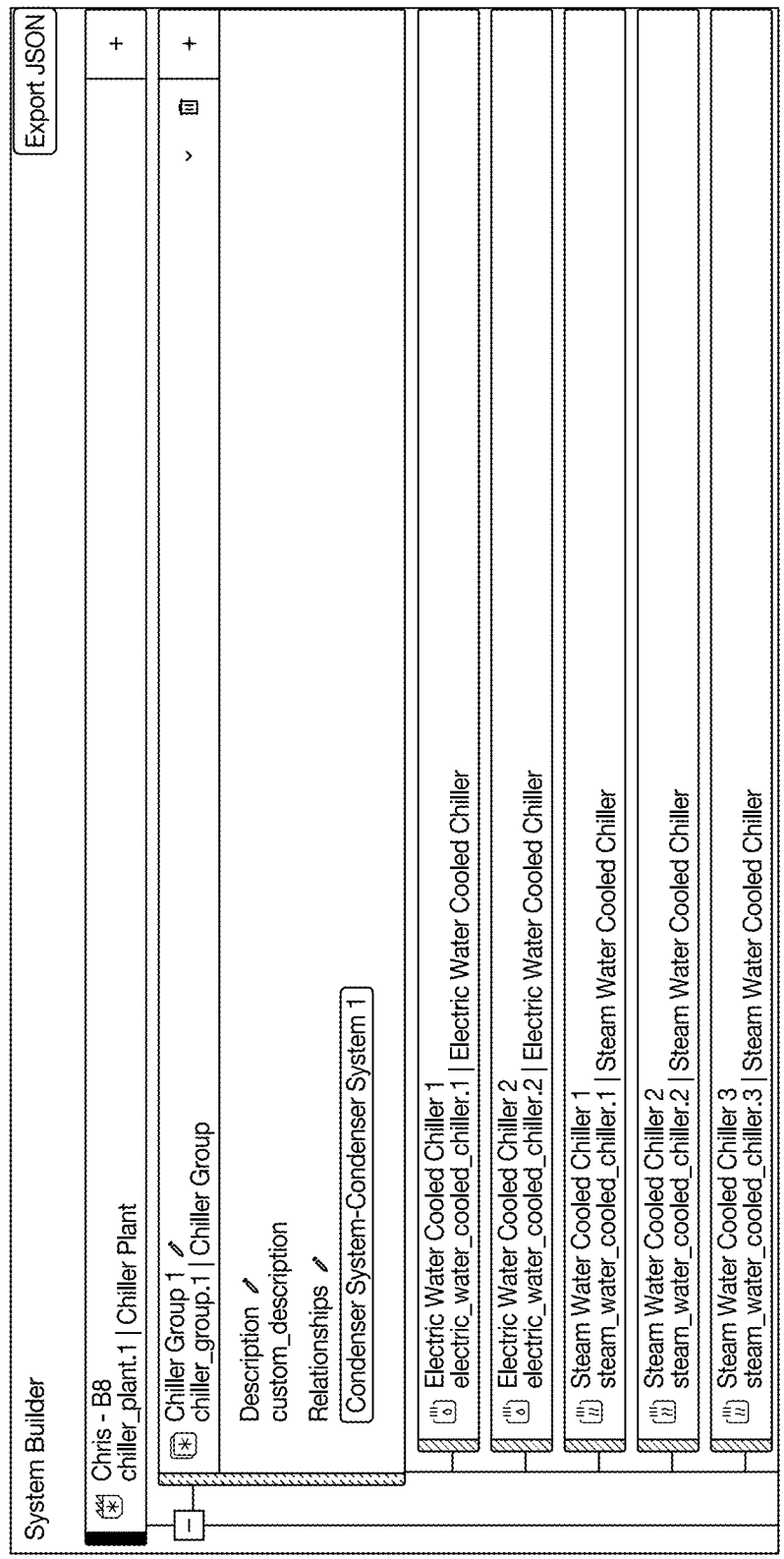
FIGS. 9A and 9B are illustrative examples of an interface for adding relationships between components.
Figure 9B:
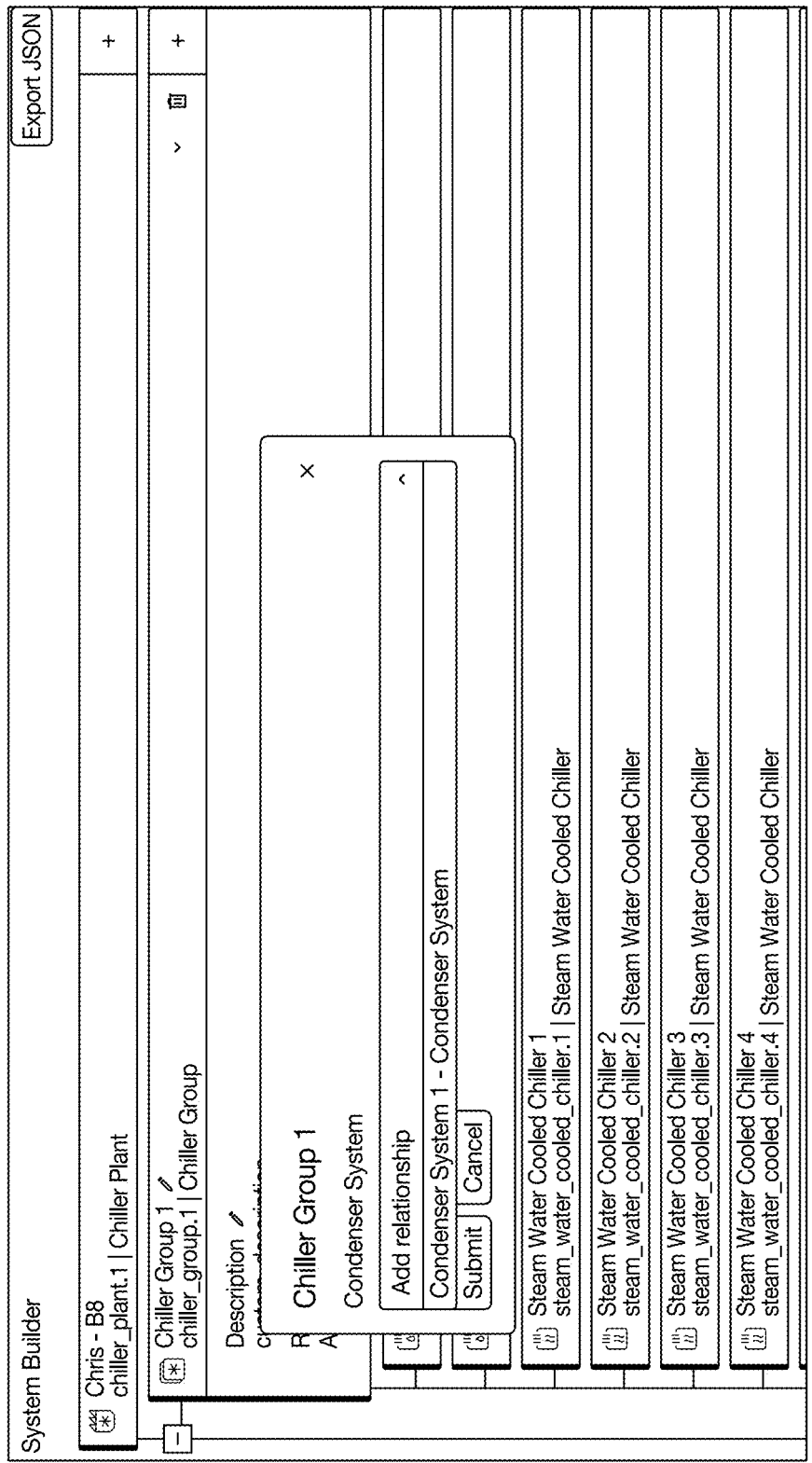
Figure 10:
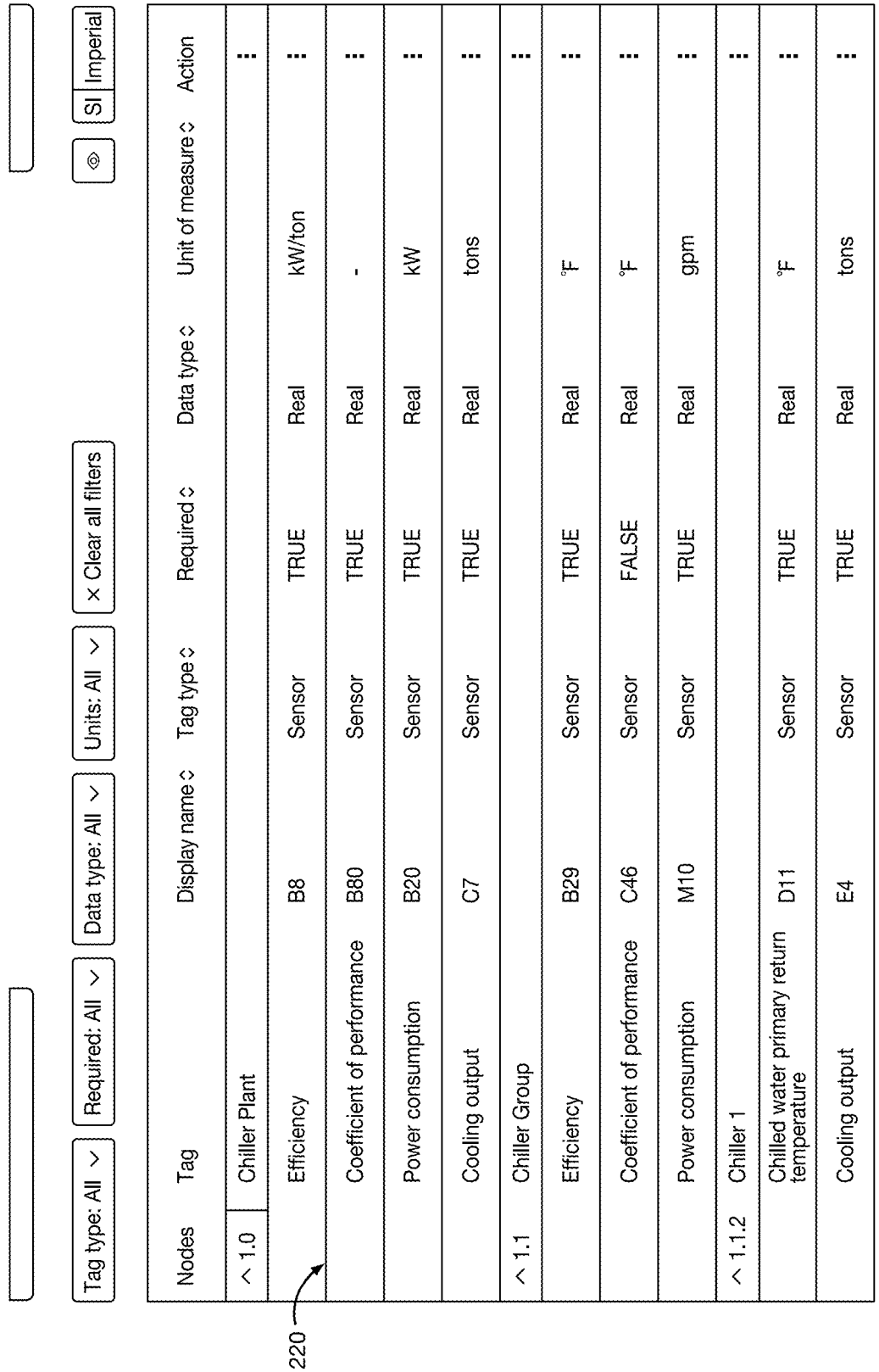
FIG. 10 are illustrative examples of the attributes selected for the components and adding a new attribute to a component, respectively.

In variants, in operation (e.g., example shown in FIG. 1), a user can initialize a new industrial system instance by selecting an industrial system type from a set of available industrial system types. The user can then select components, from a set of components for the industrial system type, to include in the industrial system instance (e.g., parent components from the set of available parent components; etc.), based on their industrial system's physical configuration (e.g., examples shown in FIG. 8A and FIG. 8B). All parent/child relationships are automatically imposed; additionally or alternatively, the user can optionally define relationships between components (e.g., example shown in FIG. 9A and FIG. 9B). Each component can be associated with a set of attributes (e.g., provided by the template; examples shown in FIG. 10). In variants, the set of attributes can be or include machine learning features for a machine learning-based control model for the industrial system and/or component (e.g., determined using feature selection; based on a different instance of the industrial system and/or component). The system (e.g., platform) can optionally automatically populate required components (e.g., associated with required machine learning features) in the industrial system instance. The user can map their industrial system data (e.g., columns, datastream identifiers, pointers, API endpoints, subscription endpoints, URIs, etc. e.g., example shown in FIG. 4) to the attributes (e.g., example shown in FIG. 10). The system can optionally automatically compute machine learning features for the industrial system based on the industrial system data mapped to the attributes and/or the industrial system instance representation (e.g., secondary ML features in addition to the attributes; ML features based on the attributes; ML features based on the industrial system configuration; etc.). The system can optionally automatically retrieve the data cleaning modules, imputation modules, and/or other processing modules associated with each attribute, and process the data mapped to each attribute with the respective processing module.

Figure 2:
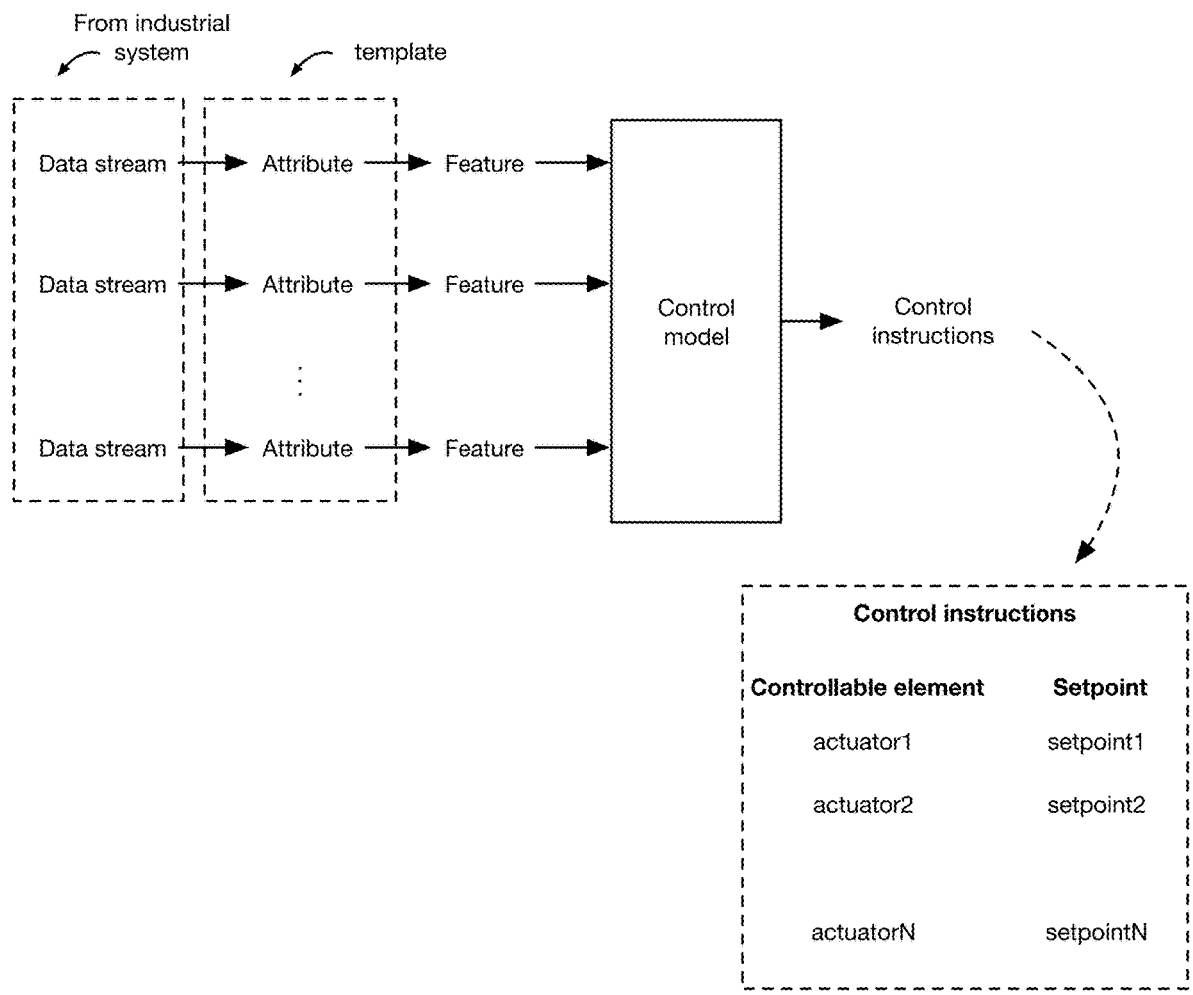
FIG. 2 is a schematic representation of examples of a control model; the relationship between the industrial system data, the template attributes, and the model features; and control instructions.

The system can then use the predetermined attribute-model feature mapping (e.g., which can be known a priori, be associated with the template, be manually specified, etc.) to map the industrial system data to the model feature and/or model input heads for a control model specific to the industrial system type (e.g., example shown in FIG. 2). For example, a user can associate attributes with identifiers for industrial system data streams. The system can also determine a set of constraints for the control model (e.g., based on a set of predetermined constraints for the industrial system or component; based on the relationships from the industrial system configuration; receive manually specified constraints; etc.). The system can then train, tune, execute, or otherwise operate the control model using the industrial system data streams and/or the set of constraints.

The user can then affirmatively deploy or promote the trained model to their industrial system. In examples, this can connect the data streams to the model, initialize an instance of the model in a runtime environment (e.g., a processing system remote from the industrial system, etc.), and/or otherwise deploy the model. After deployment, the model can iteratively determine control instructions (e.g., setpoints) for the industrial system (e.g., for the controllable elements) based on the data streams received from the industrial system (e.g., using the data stream-model feature mapping determined using the template), wherein the control instructions can be sent to the industrial system (e.g., examples shown in FIG. 1 and FIG. 2). An example of control instruction determination using an industrial system model is described in U.S. application Ser. No. 17/525,694 filed 12 Nov. 2021 and/or PCT Application number PCT/US22/49722 filed 11 Nov. 2022, each of which is incorporated in its entirety by this reference; however, other control instruction determination methods can be used. The industrial system can then be controlled based on the control instructions, and the control instruction determination method can be repeated using updated industrial system data (e.g., for a subsequent timestep). However, the system can be otherwise used.

The system can be used with one or more industrial systems 10. Examples of industrial systems can include: power plants, cooling centers, data centers, manufacturing plants, commercial buildings, and/or other systems or facilities. The industrial systems can be mission-critical (e.g., infrastructure) or not mission critical.

Each industrial system 10 can include a set of components 12. Components 12 can include physical components, virtual components, or other components.

Examples of physical industrial system components can include: subsystems, machines, actuators, sensors, and/or other components. The physical components can each generate one or more data streams, which can include: state data (e.g., industrial system parameter values for a given timeframe), control setpoint data, measurements, error data, log data, and/or other data. One or more of the physical component types can be directly controlled by the system, indirectly controlled by the system (e.g., wherein the system controls the component's state by controlling another connected component), not controlled by the system, or otherwise controlled. The physical components can be organized hierarchically, or be organized in a flat structure. In an example, an industrial system can include a set of subsystems, wherein each subsystem can include a set of machines, actuators, sensors, and/or other components; and wherein each machine can also include a set of actuators, sensors, and/or other components.

Examples of subsystems can include: HVAC systems, cooling systems, fluid provision systems, forming systems (e.g., press systems, injection molding systems, etc.), lighting systems, heating systems, fabrication systems, and/or other subsystems. Each subsystem can include one or more machines, actuators, sensors, and/or other component types. Each subsystem can be controlled as a whole, or be controlled at lower levels (e.g., by controlling the individual machines or actuators of the subsystem, etc.).

Examples of machines can include: chillers, cooling towers, reactors (e.g., bioreactors, chemical reactors, etc.), mixers, blenders, milling machines, granulation machines, extruders, compressors, presses, air handling units, printers, conveyor systems, pick and place machines, deposition chambers, etching machines, deposition machines, ovens, drills, and/or other machines. Each machine can be part of one or more subsystems, and can include one or more actuators, sensors, and/or other component types. Each machine is preferably controlled as a whole by the system, but can additionally or alternatively be controlled piecemeal (e.g., actuator by actuator).

Examples of actuators can include: pumps, valves, heaters, lights, impellers, fans, and/or other actuators. Each actuator can be part of a machine, subsystem, or other component. The actuators can be directly controllable by the system (e.g., the system can directly control the actuator's setpoint or actuation), indirectly controllable by the system (e.g., the system can control the actuator's state by controlling another actuator or component), not controllable by the system, and/or otherwise controllable or not controllable.

Examples of sensors can include: temperature sensors, flow rate sensors, pressure sensors, voltage sensors, current sensors, mass sensors, concentration sensors, timers, resistance sensors, volume sensors, capacitance sensors, humidity sensors, actuator state sensors, and/or other sensors. The sensors function to monitor (e.g., measure) the state or a parameter of the industrial system or component thereof. Each sensor can be part of a machine, subsystem, actuator, or other component. The sensors are preferably not controllable by the system, but can alternatively be controllable (e.g., turned on or off by the system; controlled to send data to the system upon request, etc.).

The industrial system 10 can optionally include virtual components or conceptual components, which function as abstractions, conceptual groupings, or virtual representations (e.g., digital twins, simulations, etc.) of a set of physical components. The virtual components can also be represented by template components, and can also be associated with attributes (e.g., machine learning features), models, and/or other component information. Examples of virtual components can include: a facility (e.g., a group of physical components or subsystems), a loop (e.g., chiller loop, media flow loop, etc.), and/or other virtual components. The virtual components can be defined: heuristically, manually (e.g., by an industrial system operator), operationally (e.g., based on physical components relationships and/or dependencies), and/or otherwise defined. The industrial system can generate (e.g., calculate) data streams for the virtual components based on: data streams from the physical components associated with the virtual component; simulations (e.g., using physics models, machine learning simulation models, etc.); and/or otherwise generate virtual component data streams.

The industrial system 10 can optionally include one or more local control systems (LCS), which functions to control industrial system operation. The LCS can be a legacy control system, a deterministic control system, a manual control system, and/or other control system. An LCS can directly control one or more components (e.g., actuators) by setting setpoints, changing power provision (e.g., changing current provision, voltage settings, etc.), and/or otherwise controlling the components. The local control systems can include manual interfaces, control loops (e.g., deterministic control loops, etc.), and/or be otherwise configured. The system can control the LCS by directly specifying the component setpoints, by setting higher-level LCS setpoints or targets, by replacing or integrating into the LCS, or otherwise controlling the LCS. In variants, the system can control the industrial system components through the LCS. For example, the system can issue setpoints to the LCS for a given component, wherein the LCS implements the setpoint. In another variant, the system can bypass the LCS. However, the system can otherwise interface with the LCS.

In an illustrative example, the industrial system can include one or more facilities. Each facility can include one or more individual plants. Each plant can include one or more components, such as subsystems, machines, actuators, sensors, and/or other components. In a first example, each individual plant is controlled by a different LCS. In a second example, all or a subset of the plants are controlled by a centralized LCS.

However, the industrial system can include other components.

Each industrial system 10 can generate a set of industrial system data. The set of industrial system data preferably includes a set of industrial system data streams 20, but can additionally or alternatively include singular values, constants, and/or other data. The industrial system data can be generated: by physical components, using aggregations of physical component data, by approximations or simulation, by imputation, and/or otherwise generated. Examples of industrial system data can include: subsystem data streams (e.g., of the subsystem state, error codes, metrics, and/or other data), machine data streams (e.g., of the machine state, error codes, metrics, and/or other data), sensor data streams (e.g., all or a subset of the sensor data streams; secondary data streams that were derived or aggregated from the sensor data streams, such as power, energy, percentage, efficiency, and/or other secondary data), actuator data streams (e.g., data streams of the actuator state, setpoints, etc.), industrial system states (e.g., data stream values for a given timeframe), and/or other data generated by the industrial system and/or components thereof.

The data streams 20 of the industrial system 10 can be unlabeled, labeled with a system-standard attribute (e.g., tag), labeled with a custom identifier (e.g., using the industrial system's ontology, etc.), labeled using the manufacturer name for the sensor, and/or otherwise labeled. The system-standard attributes available for use as a label are preferably determined based on the industrial system representation (e.g., set of related components), but can alternatively be manually determined, retrieved from a library of attributes, or otherwise determined. In examples, each component representation can be associated with a set of system-standard attributes, wherein inclusion of the component representation in an industrial system representation makes the system-standard attributes available for use as a label. However, the available labels can be otherwise determined.

The data streams 20 can be: automatically labeled (e.g., by a machine learning model, using a set of heuristics, etc.), manually labeled (e.g., by an industrial system operator or controller, by a user, etc.), and/or otherwise labeled. In a first example, the data stream can be automatically labeled by mapping the name of the industrial data stream or name of the data stream source to a predetermined attribute (e.g., using a set of heuristics for the attribute, using a trained labeling model, etc.). In a second example, the data stream can be automatically labeled based on the data type, pattern, values, other metadata, data source, relationship between a representation of the data source (e.g., component) with other components within the industrial system representation, and/or otherwise determined. In a third example, the data stream can be manually labeled using an interface, wherein a user can select the label or attribute to map to the industrial system data stream.

One or more data streams 20 generated by the industrial system 10 can be ingested by the system. In a first variant, all data streams generated by the industrial system are ingested (e.g., received) by the system. In a second variant, only a subset of the data streams generated by the industrial system are ingested (e.g., received) by the system (e.g., only data streams associated with, mapped to, or tagged with attributes; only data streams authorized by an industrial system operator; etc.). However, any number of data streams generated by the industrial system can be ingested (e.g., received) by the system. Data stream transmission from the industrial system to the system can be encrypted (e.g., using TLS, SSL, stream ciphers, CMEK (customer managed encryption keys), DEK (data encryption keys), KEK (key encryption keys), etc.) and/or otherwise secured.

In variants, the system can additionally or alternatively ingest and/or use auxiliary data streams 20. Auxiliary data streams can include historical or predicted: weather data, energy data (e.g., power supply, power pricing, etc.), load or utilization data (e.g., data center load, number of AC units running, number of bioreactors running, etc.), and/or other data. The auxiliary data streams can also be associated with attributes (e.g., mapped to tags, etc.), wherein the attributes and associations can be determined in a similar or different manner from industrial system data stream attribute associations.

The data streams 20 can be stored or represented as: a point list, a set of values, as a file (e.g., storing historical data), as a vector or set thereof, as a live stream, and/or otherwise stored or represented. The data streams can be received using a publication-subscription architecture (e.g., wherein the system subscribes to the data stream's publication stream); using a request-response architecture (e.g., wherein the system requests each datum, data stream segment, or other portion of the data stream); using a webhook (e.g., wherein the system subscribes to a webhook provided by the data source or industrial system); or using any other suitable data transmission and/or streaming architecture.

Each data stream 20 is preferably assigned to a single attribute 220, but can alternatively be assigned to multiple attributes. Each attribute is preferably assigned a single data stream, but can alternatively be assigned multiple data streams.

After data stream ingestion, all or a subset of the ingested data streams can be used by the system. In a first variant, only a subset of the data streams generated by the industrial system are ingested and/or used by the system (e.g., only the mapped or tagged data streams are used by the model); example shown in FIG. 13. For example, only linearly independent data streams are ingested and/or used by the model. In an illustrative example, cold aisle temperatures may not be ingested and/or used by the model predicting PUE when more fundamental data streams, such as cooling tower leaving condenser water temperature and chilled water injection setpoints are ingested and/or used. In another example, only a subset of linearly independent data streams are ingested and/or used by the model (e.g., only linearly independent and/or fundamental data streams that are identified as being high-lift model features or associated with components are ingested and/or used). In an illustrative example, only a subset of fundamental data streams, such as only the chilled water injection setpoints but not the cooling tower leaving water temperature, are ingested and/or used. In a second variant, all ingested data streams are used by the system. In a third variant, a subset of the ingested data streams are used by the model, but all ingested data streams or additional data streams can be ingested and used by the model in response to satisfaction of a condition (e.g., when an unexpected industrial system response is encountered). However, any other set of data streams can be used.

In variants, the system can validate one or more of the data streams 20 to ensure that the data stream includes the expected data for the associated attribute (e.g., "healthy data"). The data streams can be validated: before imputation, before use as training data, before use in control instruction determination (e.g., before use in inference and/or prediction), and/or at any other suitable time. The data streams can be validated using one or more data health rules. The data heath rules can be: specific to the attribute that the data stream is assigned to (e.g., determined based on the attribute), specific to the component representation that the data stream is associated with, a generic set of data health rules, be specific to the data stream itself, be a manually-specified set of data health rules, and/or any other suitable set of data health rules. The data health rules can include: a set of rules, a set of heuristics (e.g., values should monotonically increase or decrease, values should occur at a predetermined frequency, values should be within a predetermined range, values should follow a predetermined pattern, etc.), a machine learning model (e.g., trained to identify healthy and unhealthy data), and/or be otherwise constructed. The data health rules can evaluate the health of: the entire data stream, segments of the data stream (e.g., a sliding window of values, a predetermined time window of values, etc.), individual values within the data stream, multiple data streams (e.g., when the health of a data stream is evaluated as a function of another data stream; when the data health rule evaluates whether the relationship between the data streams are expected; etc.), and/or any other portion of a data stream or combination thereof. Unhealthy data can be removed, imputed, automatically corrected, manually corrected (e.g., wherein a user is notified of the unhealthy data), ignored, or otherwise managed.

In variants, the system can impute one or more of the data streams 20 to ensure that the data is complete. Imputing a data stream can include: filling in missing data (e.g., interpolating or extrapolating the existing data to fill the data gap); replacing bad data (e.g., identified during data stream validation), and/or otherwise completing the data. Examples of imputing the data stream can include: using interpolation, extrapolation, heuristics, rules, expressions, other rules, and/or other methods of completing the data. Different imputation methods can be used for different temporal segments of the data stream; alternatively, the same imputation method can be used to fix all problematic segments of the data stream (e.g., example shown in FIG. 6). For example, different expressions can be derived for different data stream timeframes (e.g., defined by start and end times), wherein the different data stream timeframes suffer from different issues (e.g., example shown in FIG. 7). The imputation method that is used can be: specific to the attribute that the data stream is assigned to (e.g., determined based on the attribute), a generic set of imputation methods, be specific to the data stream itself, be specific to the data health failure type (e.g., determined by the data health rules and/or any other suitable set of data health rules. The imputation method and/or expression can be manually determined (e.g., selected, expressed, etc.), automatically determined (e.g., automatically assigned based on the data health failure type, component type, attribute type, etc.), determined using a trained machine learning model (e.g., that predicts the expression, given healthy data for the data stream), determined by evaluating a plurality of candidate imputation expressions (e.g., using the data health rule for the data stream), and/or otherwise determined. However, the system can otherwise process the industrial system data.

Figure 11:
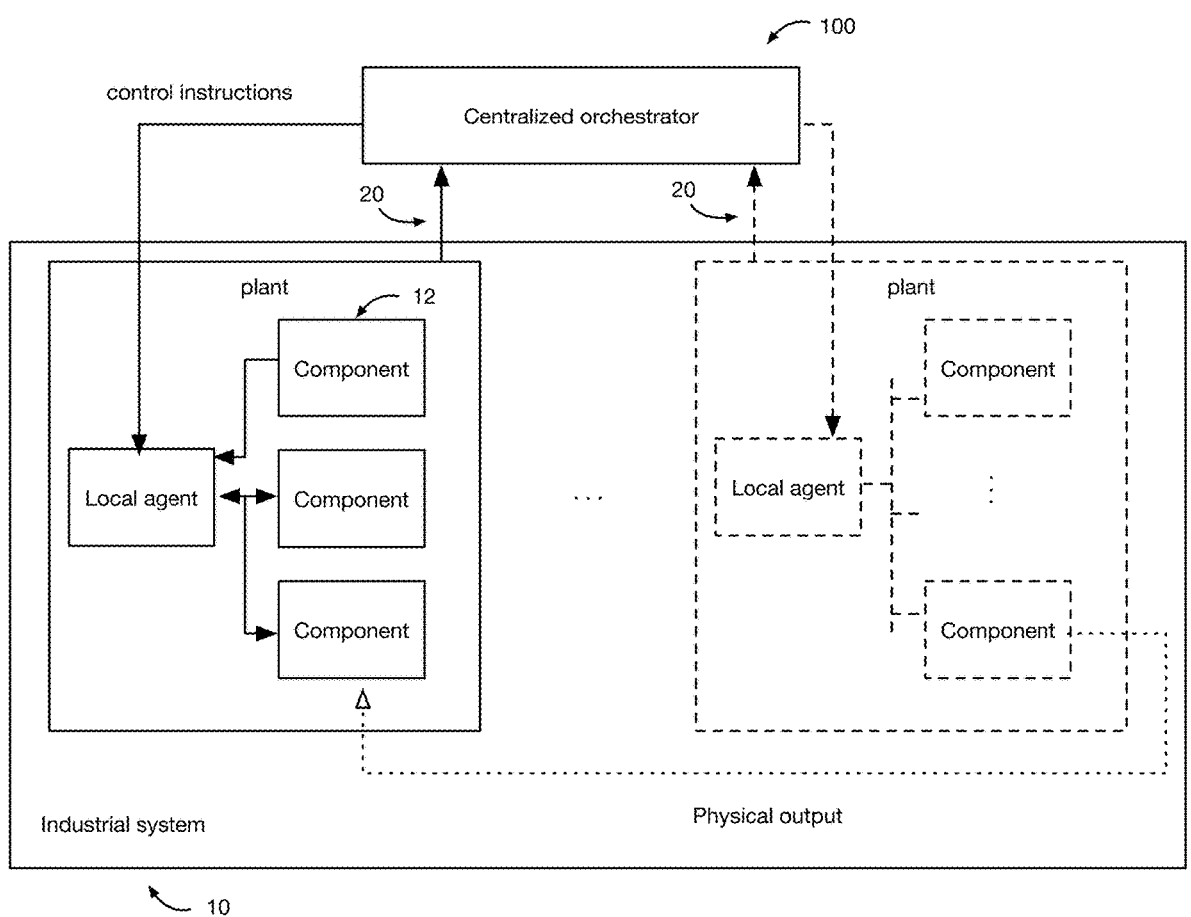
FIG. 11 is a schematic representation of an example of an industrial system and a hierarchical control model.

The system can be used with a set of control models 100 (e.g., examples shown in FIG. 1 and FIG. 5), which function to determine control instructions for an industrial system. The control instructions preferably include one or more setpoints (e.g., for a component, subsystem, facility, etc.), but can additionally or alternatively include component calls (e.g., actuator driver calls, machine driver calls, etc.) and/or other instructions. In an example, a control model can determine a target setpoint for one or more controllable elements or high-level performance metric of the industrial system (e.g., does not determine actuator control instructions), wherein the industrial system locally controls its actuators to satisfy the target setpoint (e.g., using the industrial system's LCS(s)). In a specific example, the control model includes a set of plant control models, each configured to determine setpoints for components within the respective plant (e.g., for the subsystems, for the machines, for the actuators, etc.). In this specific example, the control system can also include a centralized orchestrator, with a centralized control model, configured to determine high-level setpoints for each plant (e.g., power consumption setpoints, load setpoints, etc.), such as to balance the load across the plants (e.g., to maintain consistent output); example shown in FIG. 11. In this specific example, the local agents for each plant can then determine component-level setpoints for the plant's respective components, based on the respective high-level setpoint. In a second example, a control model can determine actuator control instructions (e.g., current output, voltage output, etc.), wherein the industrial system's actuators are controlled according to the actuator control instructions. In a third example, the control model can be those described in U.S. application Ser. No. 17/525,694 filed 12 Nov. 2021 and/or PCT Application number PCT/US22/49722 filed 11 Nov. 2022, each of which is incorporated in its entirety by this reference. However, the control models can be otherwise configured.

The control models 100 can execute locally (e.g., within the industrial system), remotely (e.g., physically remote from the industrial system), and/or in any other suitable physical relationship with the industrial system. For example, the plant control models can run locally to the industrial system, while the centralized orchestrator can run remotely. In another example, the plant control models and the centralized orchestrator can run remotely from the industrial system.

In a first variant, the control model directly determines the control instructions. In a first embodiment, the control model predicts the control instructions. In a second embodiment, the control model searches through a search space to determine an optimal set of control instructions that optimize an output variable while satisfying a set of constraints. However, the control instructions can be otherwise directly determined. In this variant, the optimal actions (control instructions) determined by the control model can be compared against a set of safety constraints (e.g., defined by the industrial system operators, preassociated with the industrial system template, etc.), and only sent to the industrial system when they satisfy the set of safety constraints. The industrial system's local control system (LCS) can optionally compare the control instructions against its own set of constraints before implementing the control instructions. In variants, this redundant check can ensure that the industrial system remains within local constraints, and that the industrial system operators can retain full control of the operating boundaries.

In a second variant, the control model can determine output variable values (e.g., be a simulation), wherein the control model is used to test a set of candidate control instructions. The candidate control instructions can be: determined by another model, be a set of predetermined control instructions, and/or be any other suitable set of control instructions.

Each control model 100 preferably determines the control instructions by optimizing for one or more goals for one or more output variables, but can alternatively determine the control instructions using a predetermined equation, using a pretrained model, using a simulation, or otherwise determining the control instructions. Examples of output variables that can be optimized include: power usage, power efficiency, material output, uptime, and/or other variables. The output variable can be for: the current timestep, the next timestep, a future timestep (e.g., several timesteps out, several hours out, etc.), a historical timestep, and/or for any other time. Examples of goals that the control model can optimize for can include: power consumption minimization, power usage effectiveness (PUE), efficiency, uptime maximization, output maximization, and/or other goals. In a first example, each control model optimizes for a single output variable, wherein multiple control models can be used for a single industrial system when multiple output variables are optimized. In a second example, each control model can optimize across multiple output variables.

Each control model 100 preferably determines the control instructions for an industrial system based on the industrial system data set, but can additionally or alternatively determine the control instructions based on constraints, manual instructions (e.g., manually-determined setpoints), and/or based on any other suitable information. In operation, the system can: receive a set of industrial system data and map each data stream from the industrial system data set to a control model feature or control model input (e.g., wherein the data stream is mapped to an attribute associated with the model feature). The control model can then determine the control instruction based on the mapped data streams, wherein the control instructions can be used to control operation of the industrial system.

Figure 5:
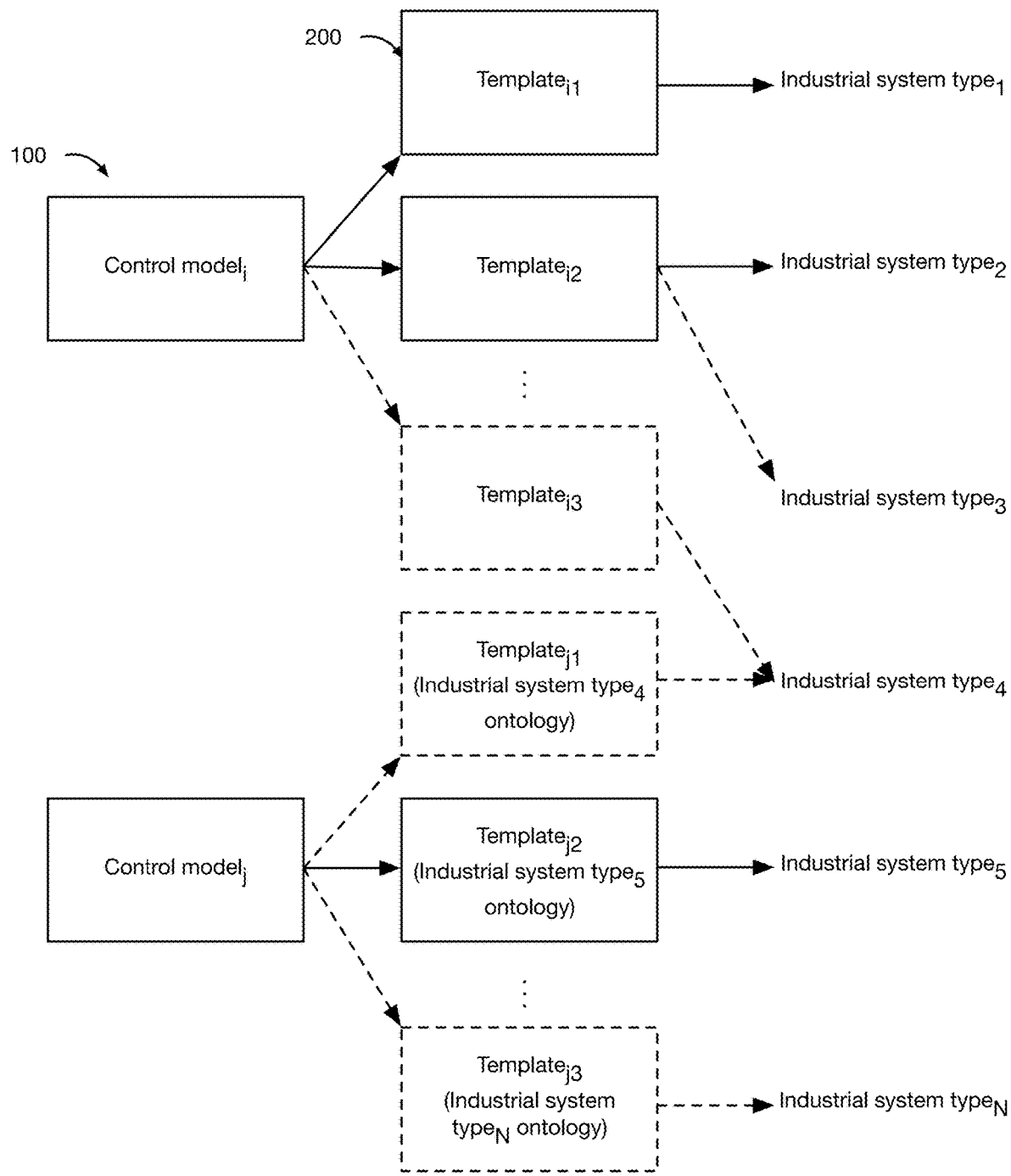
FIG. 5 is a schematic representation of the relationships between control models, templates, and industrial system types.

Each industrial system type can be associated with a single control model, or be associated with multiple control models (e.g., examples shown in FIG. 5). Each control model is preferably specific to a single industrial system type, but can alternatively be used for multiple industrial system types. Each control model is preferably specifically tailored to the respective industrial system type. In a first example, the control model's architecture can be selected based on the industrial system type or the industrial system's characteristics (e.g., different control models can incorporate different reinforcement learning models based on whether the industrial system has a fast-responding system, slow-responding system, hierarchical control system, centralized control system, etc.). In a second example, the control model can include industrial system type-specific constraints, hierarchies, physics models, or rules. In a third example, different control models for different industrial system types can use different feature taxonomies or ontologies. In a fourth example, different control models for different industrial system types can use different model features. In a fifth example, different control models for different industrial system types can be trained using different training data (e.g., a cooling center control model can be trained using data from one or more cooling centers, while a power plant can be trained using data from one or more power plants). However, the different control models for different industrial system types can otherwise differ or be similar.

The control models 100 are preferably machine learning models, but can alternatively be statistical models, a set of rules, heuristics, leverage classical approaches, optimizations, and/or any other suitable model. Examples of machine learning models that can be used include: regression (e.g., linear regression, non-linear regression, logistic regression, etc.), decision tree, clustering, neural networks (e.g., CNN, DNN, CAN, LSTM, RNN, encoders, decoders, deep learning models, transformers, etc.), ensemble methods, optimization methods, classification, Bayesian methods (e.g., Naive Bayes, Markov, etc.), instance-based methods (e.g., nearest neighbor), genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolutional layers (e.g., in a CNN); a set of self-attention layers; and/or have any other suitable architecture. The models can extract data features (e.g., neural network feature values, neural network feature vectors, computer vision features, etc.) from the input data or use the input data itself as a model feature, and determine the output based on the extracted features. The features (e.g., encoding) can be non-human readable or non-human comprehensible, or be human comprehensible. However, the models can otherwise determine the output based on the input data.

The control models 100 can be trained, learned, fit, predetermined, and/or can be otherwise determined. The control models can be trained or learned using: supervised learning, unsupervised learning, self-supervised learning, semi-supervised learning (e.g., positive-unlabeled learning), reinforcement learning (e.g., value-based learning, policy-based learning, actor-critic learning, etc.), transfer learning, Bayesian optimization, fitting, interpolation and/or approximation (e.g., using gaussian processes), backpropagation, and/or otherwise generated. Additionally or alternatively, the control models can be manually specified or otherwise determined. The control models can be learned or trained on: structured data (e.g., data mapped to known attributes), unstructured data (e.g., unmapped data), labeled data (e.g., data labeled with a training target), unlabeled data, positive training sets (e.g., a set of data with true positive labels, negative training sets (e.g., a set of data with true negative labels), and/or any other suitable set of data.

In a first variant, the control model for an industrial system can be predetermined (e.g., pretrained, prelearned, etc.). In this variant, the control model can be predetermined using data from a similar industrial system, using simulated data, and/or using other data. The similar industrial system can be an industrial system of the same type, class, set of components, set of component types, or otherwise similar to the instant industrial system. In an example, the system can include a set of industrial system templates, each associated with a type of industrial system and a predetermined control model trained on data for industrial systems of the same type (e.g., example shown in FIG. 13). In an illustrative example, the set of industrial system templates can include a data center template, wherein the data center template includes a data center control model trained on other data center data. In a second illustrative example, the set of industrial system templates can include a chiller template, wherein the chiller template includes a chiller control model trained on other chiller data.

In a second variant, the control model for the industrial system can be learned, tuned, or otherwise customized for the industrial system. The control model can be learned using a neural network (e.g., a reinforcement learning agent), Bayesian optimization (e.g., wherein the acquisition function can be treated as the control model), or otherwise learned. In an example, learning the control model can include: initializing a neural network using a set of model parameters, and iteratively training the neural network to learn a mathematical model that describes the output variable as a function of the input features (e.g., the control model) using the industrial system data (e.g., using forward propagation and/or backward propagation). In operation, the control model can be optimized to determine the control instructions (e.g., setpoints). The neural network can be initialized using a random seed or initialization (e.g., from scratch, de novo, etc.), initialized using model parameters from a predetermined control model (e.g., for the industrial system type, similar to that disclosed in the first variant), or otherwise initialized. The neural network can be trained using the historical data streams from the industrial system as training inputs and the historical output variable values or historical setpoints as training targets, or otherwise trained.

However, the control model can be otherwise determined.

Any model can optionally be executed, validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

The models can be run or updated using: current data from the industrial system, historical data from the industrial system, auxiliary data, simulated data, data from other industrial systems, and/or other data. The data can include: values for the model features or inputs, values for the output variable(s), setpoint data, and/or other data.

Each control model 100 can be used with a set of model features (e.g., example shown in FIG. 2). The model features are preferably characteristics of the industrial system data set (e.g., the expected industrial system data set for the industrial system type associated with the respective control model), but can be calculated from the data set or be otherwise defined. The features are preferably numerical features but can additionally or alternatively be categorical, ordinal features, binary features, text features (e.g., tokens), and/or other features. The features can be independent (e.g., linearly independent), but can alternatively be related. The features can be scaled (e.g., normalized) to reduce the range of raw feature values (e.g., using a predetermined mapping function), but can alternatively remain unscaled. The features preferably each have a semantic meaning in the industrial system space (e.g., represents a data stream, control point, setpoint, a physical aspect, etc.), but can additionally or alternatively include nonsemantic features (e.g., features that lack semantic meaning). Examples of model features can include: temperature, pressure, flow rate, voltage, current, power, pump speeds, server load (e.g., per room, per center, etc.), number of a component type (e.g., number of pumps, number of cooling towers, number of chillers, number of drycoolers, number of injection pumps, etc.), fluid ingress temperature, fluid egress temperature, ambient environment parameters (e.g., outside air wet bulb temperature, dry bulb temperature, enthalpy, relative humidity, wind speed, wind direction, etc.), statistical measures thereof (e.g., first derivative, second derivative, etc.), meta-variables thereof (e.g., totals, averages, etc.), and/or other features. The features (e.g., feature values) can be: received from the industrial system (e.g., a data stream), calculated from data received from the industrial system, determined using a set of machine learning layers (e.g., encoding layers, initial layers or input layers from a model trained end-to-end to predict an output variable value, etc.), and/or otherwise determined.

The model features are preferably model inputs (e.g., wherein the feature values are used as model inputs, map to different model input heads, map to different input vector positions, etc.), but can be otherwise used. For example, values for different model features can be aggregated into a vector (e.g., wherein the value for each model feature is aggregated into a predetermined vector position for the model feature) and provided to an input head of the control model or model layer (e.g., intermediate layer, decoding layer set, etc.). In another example, different model features are provided to different input heads. However, the model features can be otherwise provided to the model.

The model features used by the model can include: selected features (e.g., selected using feature selection, manual selection, etc.), extracted features, all features available to the system, a feature for each data stream generated or sent by the industrial system, and/or any other suitable set of features. The features can be extracted using: autoencoders (e.g., embeddings), principal component analysis (PCA), singular value decomposition, linear discriminant analysis, and/or other methods. The features can be selected using: filter methods (e.g., information gain, a chi-square test, fisher's score, correlation coefficient, variance threshold, mean absolute difference, dispersion ratio, etc.); wrapper methods (e.g., forward feature selection, backward feature elimination, exhaustive feature selection, recursive feature elimination, etc.); embedded methods (e.g., LASSO regularization, random forest importance, etc.); lift analysis; and/or other methods.

In variants, the template attributes 220 (associated with the respective control model) preferably include all of the model features for the control model, but can alternatively include a subset of the model features, wherein the remainder of the model features can be calculated from the subset of model features included in the attributes, or otherwise determined. The attributes 220 preferably only include model features, but can alternatively include additional variables.

Each control model 100 is preferably associated with a different set of model features that are specific to the respective control model, but can alternatively be associated with the same set of model features. Different control models' model feature sets can overlap, be entirely distinct, or be otherwise related.

In variants, the set of model features for a given control model can be selected from a set of candidate features. This can function to: reduce computational time and/or load (e.g., by reducing the number of model features that need to be extracted and/or processed), increase score prediction accuracy (e.g., by reducing or eliminating confounding model features), and/or be otherwise used. The set of model features can be selected: manually (e.g., by a domain expert, etc.), automatically, randomly, recursively, using a feature selection model, using lift analysis (e.g., based on an feature's lift), using any explainability and/or interpretability method, based on an feature's correlation with a given metric or training label, using feature engineering, using predictor variable analysis, through predicted outcome validation, during model training (e.g., features with weights above a threshold value are selected), using a deep learning model, based on a zone classification, and/or via any other selection method or combination of methods.

In a first variant, the set of model features includes only required features (e.g., features required by the control model to determine the control instructions).

In a second variant, the set of model features includes required features and optional features. The optional features can be used for context, to refine the control model determination (e.g., prediction or inference), and/or otherwise used. The optional features can be fed to the control model as inputs, fed to the control model as side channels, not provided to the control model, and/or otherwise used.

In a third variant, the set of model features includes required model features, optional model features, and manually-specified model features (e.g., additional input data specified by a user).

However, the set of model features can include any other suitable set of features.

However, the control models can be otherwise configured.

The system can include a set of templates 200, which function to normalize the industrial system data from disparate industrial system instances into a platform-standard, unified taxonomy (and/or ontology). In operation, the templates can be used to: map industrial data streams to a set of predetermined template attributes (e.g., model features for the template's control model); create constraints for and/or between the industrial data streams (and/or the attributes); identify physical sources and sinks in the industrial system (e.g., identify heat sources and heat sinks, etc.); define the action space (e.g., by aggregating the controllable elements from the template); define the control model (e.g., specify initial model parameters, specify the model parameters that should be used, etc.), and/or otherwise used.

Each template 200 can be associated with a single control model, or be associated with multiple control models (e.g., example shown in FIG. 5). Each template can be associated with a single industrial system type, but can alternatively be associated with multiple types of industrial systems.

Each template 200 is preferably derived from the respective control model, but can additionally or alternatively be associated with a control model (e.g., wherein the control model is derived for the template), manually created (e.g., by a domain expert), or otherwise created. In an example, a new template component is initialized for each new component type that was not previously included in the system (e.g., automatically, by the user), wherein attributes, constraints, control models, and/or other data can also be initialized for the new template component.

In variants, each template 200 can include a set of available components 202 (component representations), which preferably represent physical components (or collections thereof) of the industrial system (e.g., example shown in FIG. 3), but can alternatively represent virtual components of the industrial system, and/or represent any other suitable set of components.

The components 202 can be used to differentiate between different instances of the same attribute, be used to define relationships between attributes, and/or be otherwise used. Each component in the template preferably represents an industrial system component type, but can additionally or alternatively represent a specific industrial system component, a set of industrial system components, and/or represent any other suitable portion of the industrial system.

In a first variation, the template 200 is for a component type, wherein the system provides a library of available components (e.g., chillers, pumps, bioreactors, etc.). In this variation, a user can select one or more instances of different templated component types and specify the information values (e.g., relationships, constraints, etc.) from the library to collectively represent their industrial system.

In a second variation, the template 200 is for an industrial system type, wherein the system provides a library of available industrial system templates (e.g., datacenter, drug manufacturing plant, nuclear power plant, solar power plant, etc.). The industrial system template can be associated with a predetermined set of components, wherein the set of components for different industrial system templates are preferably different, but can alternatively overlap or be the same. The predetermined set of components can be required, or be a set of available components that the user can select from. In embodiments, the industrial system template can also be associated with a predetermined control model (e.g., trained using data from other instances of the same industrial system type), which can be finetuned using the industrial system's actual data, retrained, or otherwise modified. Alternatively, the industrial system template can be associated with no predetermined control model. In operation, the user can select the industrial system template for their industrial system type, optionally select components from the predetermined set of components, then specify the values for the components (e.g., assign actual industrial system data streams to the components' attributes).

However, the template 200 can be otherwise configured and/or used.

Each component 202 can be associated with a set of attributes (e.g., mapped to sensor data), a set of setpoints (e.g., a controllable elements), processing modules, auxiliary data (e.g., name, description), control model(s), and/or other data. The attributes preferably correspond to features of one or more control models of the component, but can alternatively be otherwise defined. The control models preferably use the setpoint values as a target, but can otherwise interact with the setpoints.

Each template component 202 (component representation) can be associated with: a set of required attributes or attributes available for selection (e.g., tags, predetermined machine learning features for the model, etc.), data health rules, data imputation models, constraints, relationships (e.g., predetermined relationships, relationships available for selection, etc.), a component model (e.g., physics model simulating the component response, learned model, mathematical model modeling the component response, control model predicting component control instructions or setpoints to achieve a given goal, etc.), and/or other information. In use, the component attributes are associated with an actual industrial system data stream or other industrial system data; however, the component attributes can be otherwise used.

The template component information can be: learned (e.g., from data from one or more physical components of the component type from one or more industrial systems), manually specified, automatically determined (e.g., from data sheets, etc.), or otherwise determined.

The set of components 202 can be: arranged in a graph (e.g., have predefined relationships with other components, such as subcomponents, parent components, or sibling components), not have strict predefined relationships, have manually-defined relationships, and/or be otherwise related to each other.

In a first variant, when the components are arranged in a graph, the user is preferably limited to selecting subcomponents from the set of child components related to a parent component (e.g., after a parent component has been selected), but can have other component selection options. In an illustrative example, the graph (e.g., hierarchy) of components can include: a chiller plant, which includes chiller groups, condenser systems, environments, and communication interfaces as child components (e.g., subcomponents). Each subcomponent can, itself, have child components. For example, a chiller group can include electric water cooled chillers, steam water cooled chillers, and/or other chiller types as child components (e.g., subcomponents). In another illustrative example, a cooling loop template can be prepopulated with four chiller plants, serially connected in a loop.

The components within a template can be: arranged in a graph (e.g., which collectively forms a taxonomy), not organized, or organized in any other suitable relational structure. The graph can be manually determined, determined by the control model, learned (e.g., from one or more sets of training industrial system data for the industrial system type), and/or otherwise determined. The graph can define parent-child relationships, sibling relationships, and/or other relationships. The graph can be used to define relationships between components (e.g., differentiate between different instances of the same component within the template; define which sensors are associated with a given component; etc.), impose constraints (e.g., wherein child components can inherit parent constraints), impose data health modules (e.g., wherein child components must pass both their data health modules and their parent component's data health modules), impose imputation modules, and/or be otherwise used.

In a second variant, when the components do not have strict predefined relationships, the template can provide a library of available components, wherein any number of components can be selected from the library to collectively represent the industrial system. In this variant, component relationships can optionally be defined (e.g., within a set of predetermined relationship constraints). For example, a user can select any number of chiller plants from the template library to represent a cooling loop.

However, the components can be otherwise configured.

Figure 3:
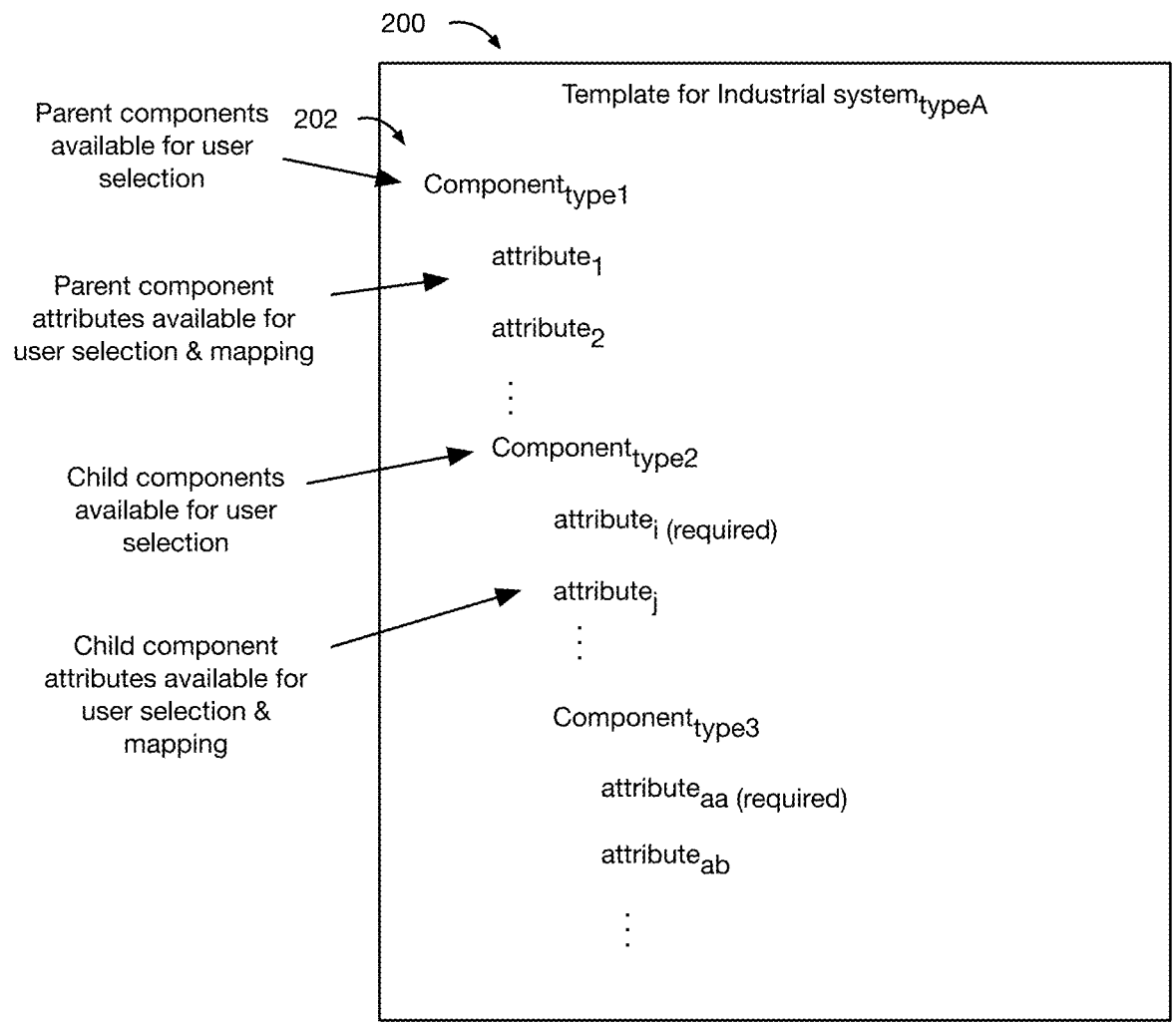
FIG. 3 is a schematic representation of an example template.

Each template component 202 (component representation) can be associated with: a set of attributes 220 (e.g., tags, predetermined machine learning features for the model, etc.), relationships (e.g., predetermined relationships, relationships available for selection, etc.; example shown in FIG. 3), setpoints, data health rules, data imputation models, constraints, a component model (e.g., physics model simulating the component response, mathematical model modeling the component response, control model predicting component control instructions or setpoints to achieve a given goal, etc.), and/or other information. The attributes 220 associated with the template can be limited to those associated with the components 202, or include additional attributes. The template component information can be: learned (e.g., from data from one or more physical components of the component type from one or more industrial systems), manually specified, automatically determined (e.g., from data sheets, etc.), or otherwise determined.

The component attributes function to provide the control model with context on how to treat a data stream associated with (e.g., tagged with) the attribute. For example, the attribute specifies which input head to feed the data stream to, or which vector index position to insert the data stream data into. In use, the component attributes are associated with an actual industrial system data stream or other industrial system data; however, the component attributes can be otherwise used. The component attributes can be required or be available for selection.

In a first variation, all components are associated with a set of attributes. In a second variation, only leaf components (e.g., components with no children) are associated with a set of attributes. However, any other suitable set of components can be associated with attributes.

A component 202 is preferably associated with a subset of the entire set of attributes (e.g., associated with a limited set of template attributes), but can alternatively be associated with all attributes. Different components are preferably associated with a different set of attributes, but can alternatively be associated with the same set of attributes.

All or a subset of a component's attributes can be used in one or more control models. In variants, each component can be associated with one or more models, wherein different subsets of the attributes associated with the component can be used for different models. In an illustrative example, a chiller can be associated with one or more control models. One model can predict the energy consumption of the chiller, and use a first subset of the attributes associated with the chiller, and a second model can predict a temperature supply for the chiller, and use a second subset of the attributes associated with the chiller.

However, the components can be otherwise defined, used, and/or related to the attributes.

The attributes 220 ("tags") of the template function as an intermediary connection that maps the industrial system data to the model features for the control model associated with the template (e.g., example shown in FIG. 2). The attributes can optionally model aspects (e.g., physical aspects, control aspects, etc.) of the respective component.

The set of attributes 220 can include only attributes for the model features of the respective control model, include other attributes (e.g., contextual attributes, semantic attributes used for user comprehension, etc.), and/or include any other suitable attributes. Each attribute in the set is preferably mapped to a single model feature of the respective control model, but can alternatively be mapped to multiple model features, or not be mapped to model features. The attributes that are not mapped to model features can be contextual attributes (e.g., included to increase user comprehension), optional attributes, and/or otherwise used.

Each attribute 220 preferably has a human-readable name, but can alternatively inherit the model feature name. The attribute name is preferably specific to the industrial system type (e.g., domain-specific) and selected from the industrial system type's ontology (e.g., examples shown in FIG. 4 and FIG. 5), but can alternatively be generic across industrial system types, standard to the platform, and/or otherwise selected. In an illustrative example, different industrial system types can use the same control model, wherein the system can include a different template for each industrial system type. In this example, the different templates would include differently-named attributes (e.g., selected from the respective industrial system domain's ontology) that map to the same model features for the shared control model. However, the attribute names across different templates can be otherwise related or unrelated.

The attributes 220 can include: sensor types, derivative values (e.g., calculated from one or more other attributes, wherein the calculations can be predetermined in the template), industrial system representation data (e.g., number of a given component, etc.), and/or other information. Examples of attributes can include: temperature, temperature delta, flow (fluidic), flow (gaseous), pressure (fluidic), pressure (fluidic delta), pressure (gaseous), pressure (gaseous delta), voltage, current, power (electrical), power (cooling), power (heating), energy (electrical), energy (cooling), energy (heating), mass, concentration, percentage, length, time, resistance, volume, area, capacitance, dew point temperature, relative humidity, efficiency, and/or other attributes.

Each attribute 220 can additionally or alternatively include a set of characteristics, which provide additional context on the attribute. Examples of characteristics can include: a name for the attribute instance; a data stream identifier(s) mapped to the attribute; how the attribute values (e.g., the industrial system data values) are obtained (e.g., requested via an API, received via a Webhook, pushed from the industrial system, etc.); whether the attribute is required (e.g., used as a model feature) or not; the type of industrial system data that is mapped to the attribute; the unit of measure for the industrial system data mapped to the attribute; the rounding digits or number of significant figures for the industrial system data mapped to the attribute; and/or any other suitable attribute characteristic (e.g., examples shown in FIG. 3 and FIG. 4). The attribute characteristic values can be predetermined (e.g., whether the attribute is required can be predetermined and uneditable), learned, inferred, defined by the user when filling out the template (e.g., in a freeform field, selected from a dropdown menu, etc.), and/or otherwise determined.

Each component 202 can optionally be associated with one or more relationships to other components. The relationships can be: hierarchical (e.g., wherein a component is a subcomponent of another component; wherein the component is a super-component of another component; etc.), temporal (e.g., wherein a component is upstream or downstream from another component), spatial (e.g., wherein a component relationship represents a physical relationship), conceptual (e.g., wherein the components are related as a conceptual group), and/or otherwise configured. The relationships can be predetermined, manually determined, automatically determined (e.g., learned from a diagram of the industrial system), required (e.g., by the control model), optional, and/or otherwise determined. The set of components can be: arranged in a graph (e.g., have predefined relationships with other components, such as subcomponents, parent components, or sibling components), not have strict predefined relationships, have manually-defined relationships, and/or be otherwise related to each other.

In a first variant, when the components 202 are arranged in a graph, the user is preferably limited to selecting subcomponents from the set of child components related to a parent component (e.g., after a parent component has been selected), but can have other component selection options. In an illustrative example, the graph (e.g., hierarchy) of components can include: a chiller plant, which includes chiller groups, condenser systems, environments, and communication interfaces as child components (e.g., subcomponents). Each subcomponent can, itself, have child components. For example, a chiller group can include electric water cooled chillers, steam water cooled chillers, and/or other chiller types as child components (e.g., subcomponents). In another illustrative example, a cooling loop template can be prepopulated with four chiller plants, serially connected in a loop.

The components 202 within a template can be: arranged in a graph (e.g., which collectively forms a taxonomy), not organized, or organized in any other suitable relational structure. The graph can be manually determined, determined by the control model, learned (e.g., from one or more sets of training industrial system data for the industrial system type), and/or otherwise determined. The graph can define parent-child relationships, sibling relationships, and/ or other relationships. The graph can be used to define relationships between components (e.g., differentiate between different instances of the same component within the template; define which sensors are associated with a given component; etc.), impose constraints (e.g., wherein child components can inherit parent constraints), impose data health modules (e.g., wherein child components must pass both their data health modules and their parent component's data health modules), impose imputation modules, and/or be otherwise used.

In a second variant, when the components do not have strict predefined relationships, the template can provide a library of available components, wherein any number of components can be selected from the library to collectively represent the industrial system. In this variant, component relationships can optionally be defined (e.g., within a set of predetermined relationship constraints). For example, a user can select any number of chiller plants from the template library to represent a cooling loop.

Each component 202 can optionally be associated with one or more setpoints, which function as default or operation targets. The component setpoints can be automatically determined (e.g., based on prior setpoints; based on prior setpoints for similar attributes with similar relationships within similar industrial systems, etc.); manually determined (e.g., specified by the user when filling out the template); and/or otherwise determined.

Each setpoint can include a set of attributes (e.g., of the component), wherein the attributes associated with the setpoint can be controllable (e.g., included within the scope of control). A controllable attribute (e.g., writable attribute) preferably defines an industrial data stream that can be controlled by the control model (e.g., can be controlled by the industrial system to output values comparable to a control-model-determined setpoint; that the control model can write values for), but can alternatively specify that the component that the controllable attribute is dependent upon can be controlled, or be otherwise interpreted. Controllable attributes are preferably defined by the template or by a domain specialist, but can alternatively be otherwise defined (e.g., by a user). For example, a water temperature setpoint attribute for a chiller component can be specified as controllable, wherein the control model can determine a target water temperature. The industrial system is then controlled such that the water temperature data stream, mapped to the water temperature attribute, satisfies the target water temperature. In another example, when the water temperature setpoint attribute is specified as controllable, the system can identify the component associated with the water temperature attribute (e.g., based on the graph), and generate control instructions for the identified component. However, the controllable attribute is otherwise used.

Each setpoint can optionally be associated with one or more constraints, which function to define the operating limits, behavior, and/or business rules for the control model. The constraints can be: automatically determined (e.g., learned from prior, similar industrial systems of the same type); manually specified (e.g., specific to the industrial system instance); and/or otherwise determined. Examples of constraints can include: rate of change, min/max limits, anti-oscillation timers, and/or other constraints.

Each component and/or attribute can optionally be associated with a set of processing modules, which function to manipulate the industrial system data. The processing modules can be applied in real-time or asynchronously. The processing modules are preferably applied before the industrial system data is provided to the model, but can additionally or alternatively be applied after or at any other suitable time. Each component and/or attribute is preferably associated with a set of processing modules, but can alternatively not be associated with processing modules. Each component and/or attribute is preferably associated with its own set of processing modules, but can alternatively share all or a subset of the processing modules with other attributes. The processing modules can be predetermined, learned, manually specified, or otherwise determined.

Examples of processing modules can include data health modules, imputation modules, and/or other modules.

The data health modules can be used to evaluate the health of the industrial data that is mapped to a component. The result can be used to: flag an incorrect data-to-attribute mapping, determine whether and/or which type of imputation module needs to be applied, and/or be otherwise used. The set of data health modules is preferably specific to the component but can alternatively be shared across different components or otherwise generic or specific. In an example, the set of data health modules can check that the type of data mapped to each component attribute is the expected data type. The data health modules can be Boolean checks (e.g., pass/fail), conditional checks, and/or other checks. The data health modules can be based on the data for one or more attributes of a given component. The data health modules can be run on: the entire industrial data stream mapped to the attributes, a segment (e.g., a time segment) of the industrial data stream mapped to the attributes, a sampling of data from the industrial data stream mapped to the attributes (e.g., random sampling, rule-based sampling, etc.), and/or run on any other suitable set of data. Examples of data health modules include: analyses of trend start and/or stop timestamps, the frequency of trend sample data, determining whether there is missing trend data within a timeframe, determining which data values are missing, determining whether the data values satisfy a threshold or range, identifying deviations from a baseline or expected data pattern (e.g., for the expected data type for an attribute of the component), statistical analyses of the data stream (e.g., minimum value, maximum value, mean, standard deviation, etc.), identifying outlier values (e.g., values outside of 3 standard deviations from the mean, outside of 4 standard deviations from the mean, etc.), identifying static data (e.g., identifying data points with a standard deviation of zero), and/or other any other suitable data health check. In an illustrative example, data health modules for a chiller can include: checking to ensure that no water temperature is ever above 25° F. or checking that the power value is above 0 when the chiller is running.

Figure 6:
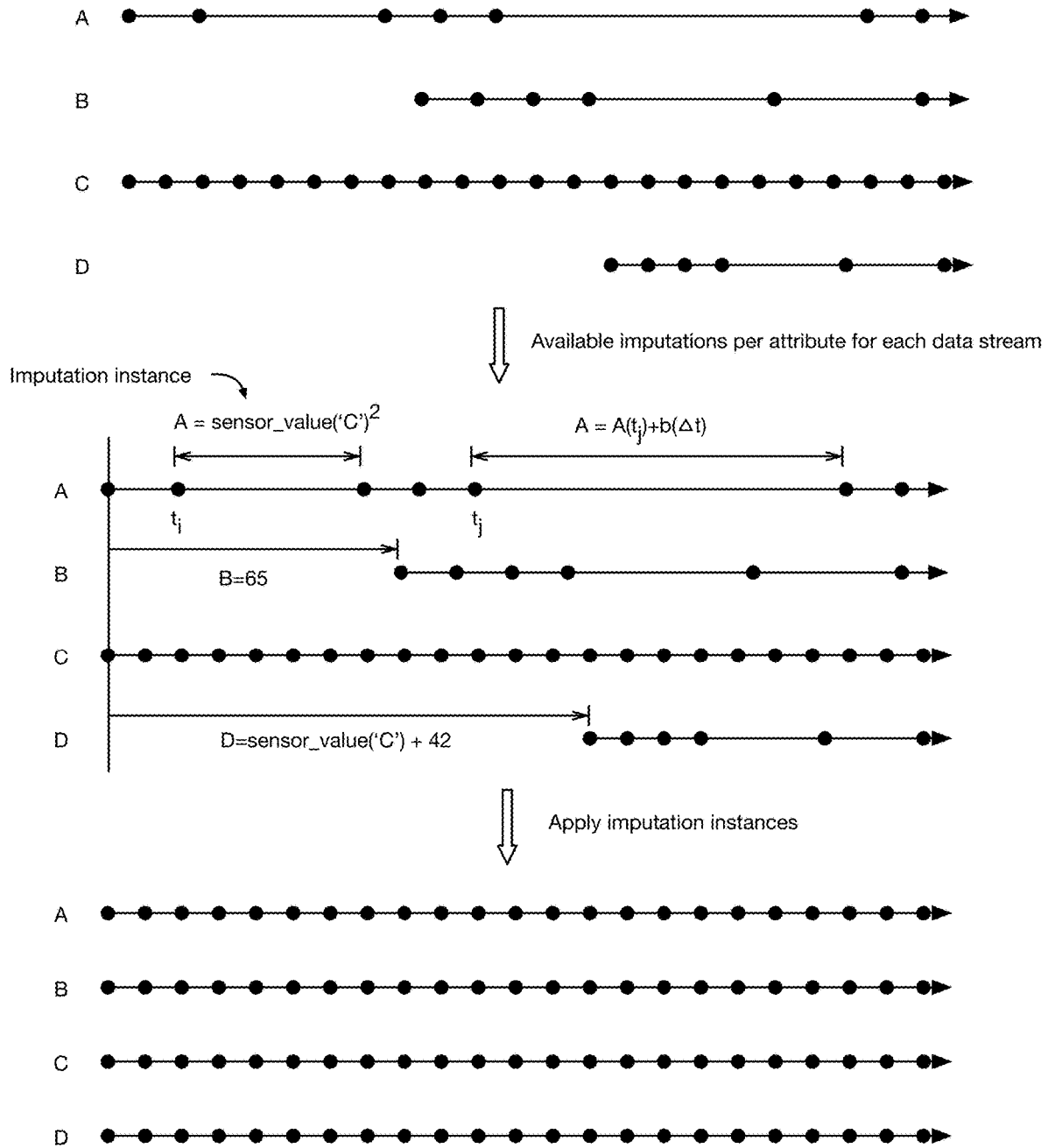
FIG. 6 is a schematic representation of an example of imputation.
Figure 7:
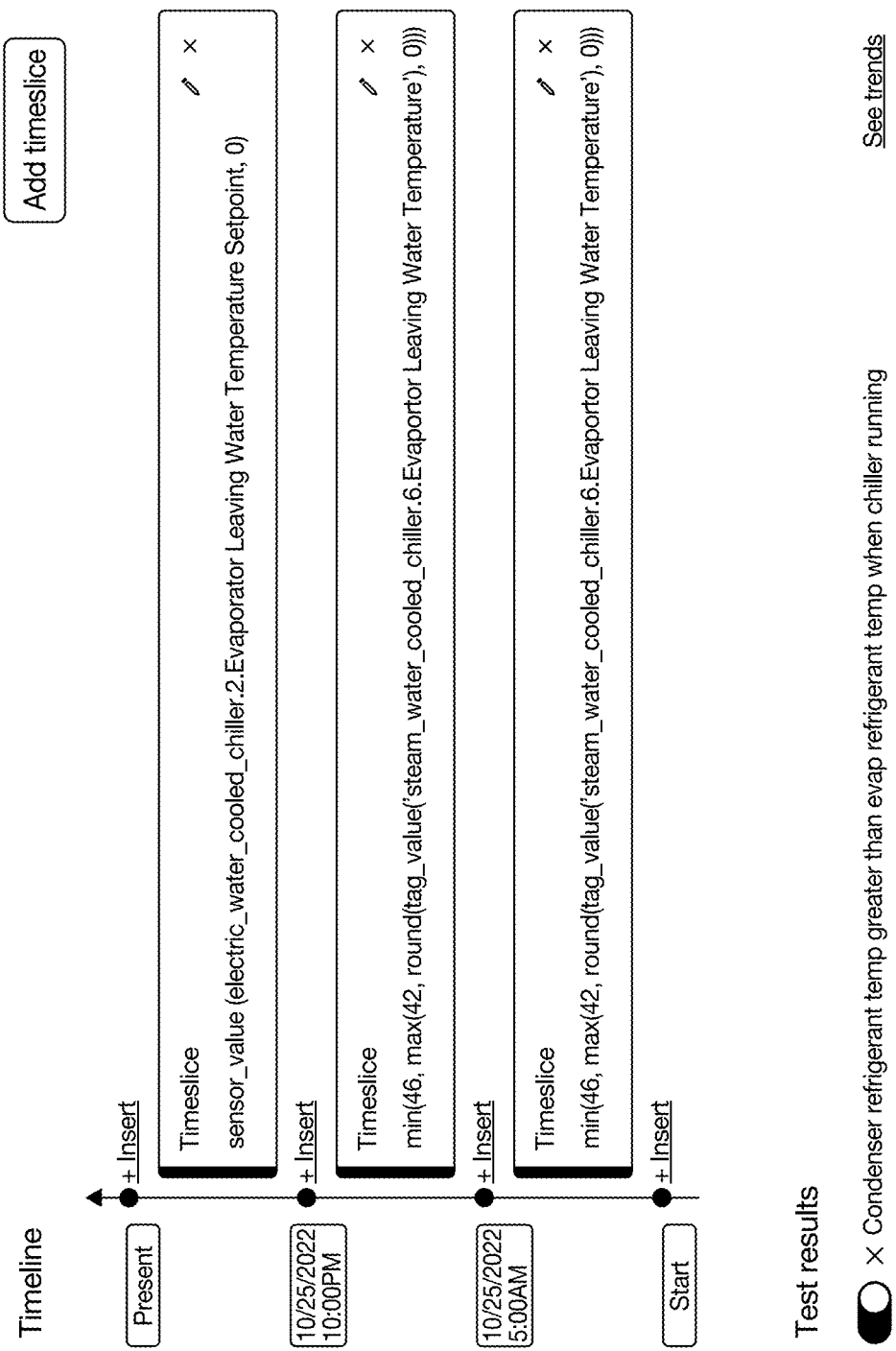
FIG. 7 is an illustrative example of imputation instances that have been determined for a data stream.

The imputation modules function to complete the data (e.g., example shown in FIG. 6). The set of imputation modules are preferably specific to the attribute, but can alternatively be generic and shared across different attributes, or otherwise related to other attributes' imputation modules. Examples of imputations can include: interpolation, extrapolation, heuristics, rules, expressions, other rules, and/or other imputations. In variants, each attribute instance (e.g., each data stream mapped to an instance of an attribute) can include its own set of imputation instances (e.g., example shown in FIG. 7), wherein the set of imputation instances are instances of the set of imputations available for the characteristic. In an illustrative example, the set of imputations for a power attribute can include interpolation and a heuristic. In this illustrative example, a first power attribute instance can include a gap in the middle of the data, wherein an interpolation, calculated based on the trendlines of the available power data mapped to the first power attribute instance, is used to bridge the gap. In this illustrative example, a second power attribute instance can lack initial data, wherein the heuristic (e.g., default power value) is used to fill in the initial data. However, the imputations for different attribute instances can be otherwise determined.

However, the components and/or attributes can be associated with any other suitable set of processing modules.

However, the components can be otherwise configured.

5. Method

Figure 12:
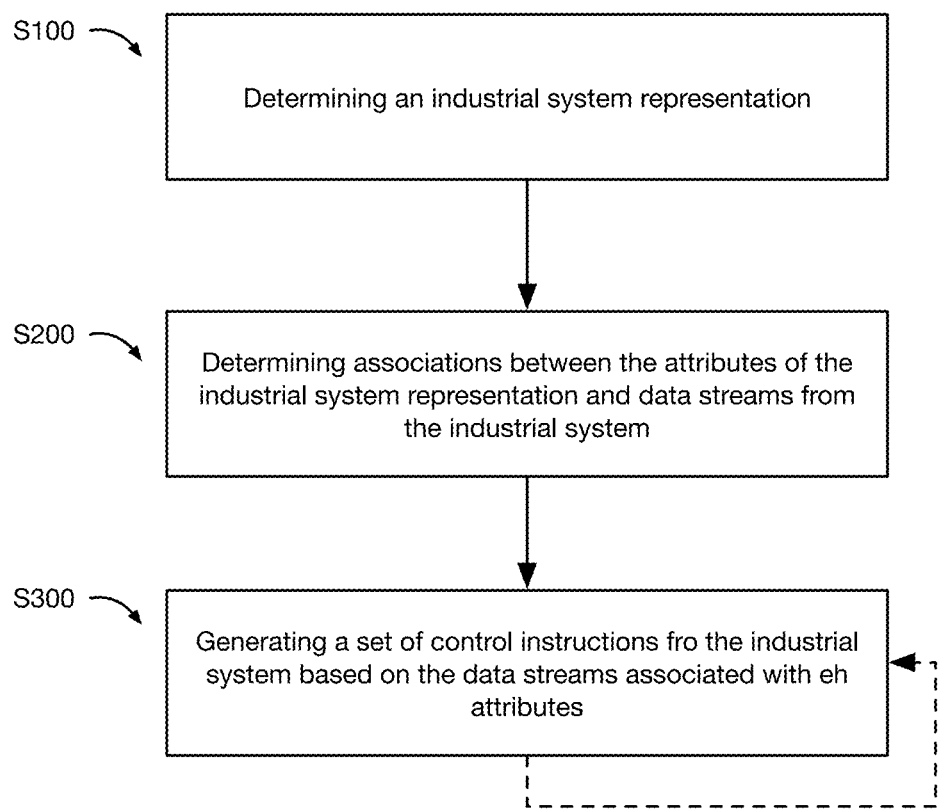
FIG. 12 is a schematic representation of a variant of the method.

In variants, the method for industrial process control can include: determining an industrial system representation S100; determining associations between the attributes of the industrial system representation and data streams from the industrial system S200; and generating a set of control instructions for the industrial system based on the data streams associated with the attributes S300 (e.g., example shown in FIG. 12). However, the method can include other processes. The method functions to leverage standardized industrial system representations for faster, scalable control model integration.

The method is preferably performed using the system discussed above, but can additionally or alternatively be performed using other systems. All or portions of the method can be performed: once, multiple times, iteratively, upon occurrence of an event (e.g., setup event, data disconnection event, etc.), and/or at any other time. All or portions of the method can be performed: manually, automatically, and/or otherwise performed.

Determining an industrial system representation S100 functions to determine a representation of a physical industrial system using the set of standard representations (e.g., templates). The industrial system representation can be selected, generated, or otherwise determined. The industrial system representation can be determined: manually, automatically, or otherwise determined. S100 is preferably performed once for a given physical industrial system, but can additionally or alternatively be periodically performed, performed when new physical components are added to the industrial system, when a new control model is generated for the industrial system, and/or performed at any other time.

In a first variant, S100 includes selecting an industrial system template for the physical industrial system's type, wherein the industrial system template can include a predetermined set of components (component representations) that collectively represent the physical industrial system's components. The industrial system template can also include a set of predetermined inter-component relationships, setpoints, constraints, a control model for the industrial system type, and/or other information. For example, a data center template can be selected for a physical data center.

In a second variant, S100 includes selecting a set of components (component representations, template components) that collectively represent the industrial system's components. In this variant, other industrial system data, such as inter-component relationships, constraints, and control models can also be determined. In a first embodiment, the template is determined by a user, wherein the user selects the set of components, optionally names each component with a unique name, specifies the component's relationships with other components, specifies the component's control constraints, and/or specifies other component information. In an example, a user can select a higher-level component (e.g., industrial system representation, component group representation, etc.); then select lower-level components from the set of available components available through the higher-level component (e.g., electric water cooled chiller, steam water cooled chiller, variable speed pump, etc.); then optionally specify relationships between the higher-level components and/or between lower-level components within the same or across different higher-level components. In a second embodiment, the template is automatically determined based on a diagram, subsystem listing, or other representation of the industrial system. In this embodiment, a template component corresponding to the physical component's component type can be selected for each component in the industrial system diagram, and the component relationships can be determined based on the component's diagram relationships.

However, the industrial system representation for the physical industrial system can be otherwise determined.

Determining associations between the attributes of the industrial system representation and data streams from the industrial system S200 functions to map industrial system data streams to model features. The attributes can be: for the industrial system template, aggregated from the component representations in the industrial system representation, and/or otherwise determined. The associations can be determined once; when new components are added to the industrial system representation; when new physical components are added to the industrial system; when an error occurs; and/or any number of times. The associations can be manually determined (e.g., using a mapping interface, wherein the data stream identifiers and the attributes are displayed, etc.), automatically determined, or otherwise determined. For example, the associations can be inferred based on the data type (e.g., the filetype, the data structure, etc.), inferred based on the name of the data stream (e.g., based on a distance metric between the attribute name and the data stream name; based on a predetermined set of data stream names or keywords associated with the attribute; etc.), inferred based on the name of the data source (e.g., wherein a data stream output by a given manufacturer's identifier is known to be mapped to a certain attribute), and/or otherwise determined. In variants, the data mapped to an industrial system representation can be queried and/or interacted with via an API, a graphical interface, or other interface.

The attribute-data stream associations can also be used to obtain data from the industrial system. Data can be obtained using: subscriptions, requests, persistent data channels, API calls, and/or otherwise obtained. For example, a subscription to a first data stream associated with an attribute can be established by the system, while subscriptions to a second data stream unassociated with any attributes are not established by the system. In a first variant, only data streams mapped to attributes are obtained from the industrial system. In a second variant, only data streams mapped to attributes and the output variables are obtained from the industrial system. In a third variant, more data streams than those mapped to attributes are obtained from the industrial system. However, the attribute-data stream associations can be otherwise used.

Generating a set of control instructions for the industrial system based on the data streams associated with the attributes S300 functions to determine control instructions that optimize for one or more output variables. S300 can be performed: for each timestep, each time horizon (e.g., number of time steps), when a predetermined event occurs, and/or at any other suitable time.

S300 is preferably determined using the control model associated with the industrial system representation, but can alternatively be determined using another model.

In a first variant, the control model is the predetermined control model associated with an industrial system template. The predetermined control model can be pretrained or pre-learned using data from other industrial systems of the same industrial system type. The predetermined control model can optionally be tuned using historical data (e.g., historical data streams, historical output variable values, etc.) for the instant industrial system.

In a second variant, the control model (e.g., policy) is learned for the industrial system based on historical data (e.g., historical data streams, historical output variable values, historical setpoint values, etc.) for the instant industrial system. The control model can be learned using a trained model (e.g., using forward and backward propagation based on historical data), reinforcement learning, and/or otherwise learned. The control model can be trained using only data streams mapped to attributes (e.g., example shown in FIG. 13), using more than the data streams mapped to attributes, using only a subset of the mapped data streams, and/or trained using any other set of data. In this variant, the control model can be trained before S200, wherein influential model features, required model features, or other model features determined using feature selection techniques are identified during and/or after model training, then mapped to data streams. Alternatively, the control model can be trained after S300, wherein the control model uses the data streams mapped to model features.

In a third variant, the control model can be selected from a set of predetermined control models. In an example, historical data for the industrial system can be used to evaluate the accuracy of each of a set of candidate predetermined control models, wherein the predetermined control model with the best performance (e.g., accuracy of predicting the output variable, accuracy of predicting the historical setpoint, etc.) is selected.

In a fourth variant, the control model can be constructed from component control models. In an example, each template component can be associated with a predetermined set of component models (e.g., component equation sets) describing the generic component's response, wherein the equation sets for each template component selected in S100 can be aggregated into an industrial system model (e.g., industrial system equation set), wherein the industrial system model (e.g., industrial system equation set) can be optimized to determine the control instructions (e.g., setpoints). In a first example, component equation sets can be aggregated into an industrial system equation set, wherein the equation set is optimized to determine the control instructions. In a second example, the inputs and outputs of the component models can be connected to other component models based on the specified component relationships, wherein the resultant model (e.g., ML-based control model) is used to determine optimal setpoints (e.g., by testing multiple scenarios and selecting the best scenario, etc.). However, the component models can be otherwise aggregated.

However, the control model for the industrial system can be otherwise determined.

In variants, S300 can include: obtaining data from the industrial system, optionally validating the data stream based on health rules, optionally imputing new data stream segments based on imputation rules, and determining the control instructions based on the data. However, S300 can be otherwise performed.

Obtaining data from the industrial system functions to determine input data and optionally validation data from the industrial system (e.g., physical industrial system). In a first variant, only tagged data streams (e.g., data streams associated with attributes) are obtained from the industrial system and/or from auxiliary sources. In a second variant, additional data, other than the tagged data streams, are obtained from the industrial system and/or auxiliary sources. In a third variant, data, such as the output variable value or meta-variable values, are calculated from the data streams. The data can be pulled periodically (e.g., every 5 minutes), streamed, received upon publication by the industrial system, or obtained at any other suitable time. The data can be received from the industrial system's database, from the components themselves, and/or from any other suitable source. However, the data can be otherwise obtained.

The method can optionally include generating values for each of the machine learning features, based on the data streams mapped to attributes representative of the machine learning feature. In variants, this can include: determining the data stream identifier, determining the attribute mapped to the data stream identifier, optionally transforming the data from the data stream, and assigning the data to the attribute, wherein the attribute is used as a machine learning feature. Transforming the data from the data stream can include: calculating meta-variable values (e.g., utilization, efficiency, total energy consumption, etc.) using data from one or more timesteps, or using data from one or more data streams; imputing the data; or otherwise transforming the data. However, the attribute or machine learning feature values can be otherwise determined.

S300 can optionally include validating the data stream based on health rules. The health rules can be the health rule for the attribute associated with the data stream, the health rule associated with the component associated with the data stream (e.g., via the attribute), the health rule associated with the data type for the data stream, the health rule for the component generating the data stream, and/or any other suitable health rule. The data stream can be checked against the health rule: at every timestep (e.g., before use by the model), periodically, when a health rule for a different data stream is violated, and/or at any other time. Data from the data stream can be checked against the health rule: individually, segment-by-segment (e.g., wherein a sliding window of data or consecutive windows of data are checked against the health rule), or in any other grouping. Data from one or more streams can be checked by a health rule. Data streams that fail health rules can be: fixed (e.g., using imputation, etc.), not used by the control model, assigned a lower weight (e.g., when used in the control model, wherein the weight can be calculated on the type of failure or by the health rule), ignored, and/or otherwise managed.

The method can optionally include imputing new data stream segments based on imputation rules, which functions to fix data stream segments. The data that is fixed can include: missing data streams, data stream segments that have failed health rules, user-identified data stream segments, and/or any other data. The data that is fixed can include: individual datum, a data stream segment, multiple datum from different data streams (e.g., concurrently fixed), multiple data stream segments (e.g., concurrently fixed), and/or any other suitable set of data. Examples of imputing the data can include: extrapolating the data, interpolating the data, using regressors (e.g., linear regressors), predicting data values (e.g., using a machine learning model), calculating the data values using expressions or rules, or otherwise imputing the data. The imputation rule used to impute the data can be specified by: a user, by the industrial system template, by the template component, by the attribute associated with the data stream, by the health rule (e.g., wherein the health rule can be used as the imputation rule), be learned (e.g., from other, healthy data within the data stream), and/or otherwise determined.

Determining the control instructions based on the data functions to determine industrial system control values to obtain a goal. The goal can be: an optimization of one or more output variables (e.g., maxima, minima, etc.), a target output variable value, and/or any other goal. The goal can be specified by the industrial system operator, a user, be a default goal, and/or be any other suitable goal. The control instructions are preferably setpoints for specific industrial system components (e.g., physical components), such as industrial system subsystems, machines, or actuators, but can alternatively include driver calls or any other instructions. The control instructions are preferably determined using the control model for the industrial system representation, but can alternatively be determined using a different model. The control instructions and/or control instruction determination (e.g., optimization, search, etc.) can be constrained by a set of constraints. The set of constraints can be specified by: the template component, the industrial system template, by a user (e.g., industrial system operator), learned (e.g., from historical data limits and ranges), and/or otherwise determined. The data used by the control model can be: data from the data streams (e.g., raw data, cleaned data, transformed data, etc.); data calculated from one or more data streams (e.g., running average, a meta-variable determined using multiple data streams, etc.); data determined from the industrial system representation structure (e.g., number of components, relationships, etc.); and/or other data. Only data mapped to attributes (e.g., input features, machine learning features, etc.) can be used by the model; alternatively, other data can be ingested by the model. The data can be ingested at: an input head of the model, an intermediary layer of the model, and/or any other suitable layer of the model.

In a first variation, S300 includes determining a set of candidate setpoints; predicting the output variable value for each candidate setpoint within the set, using data from data streams mapped to the attributes; and selecting the setpoint with the best output variable value (e.g., highest output variable value, lowest output variable value, etc.).

In a second variation, S300 includes: optimizing a control model (e.g., an objective function, a policy, etc.), learned from historical industrial system data streams that are mapped to the attributes, given the current industrial system data values mapped to the attributes to determine the setpoints. The control model can be learned using: reinforcement learning, supervised learning, unsupervised learning, and/or otherwise learned. In an example, a reinforcement learning agent can, for each time step, select an action to take (e.g., control instruction, setpoint) based on the new and historical industrial system states (which is determined from the data from the mapped data streams), the current iteration of the control policy, a sampling policy (e.g., for sampling actions that may be suboptimal but enable the agent to explore the large action space, wherein the action space can be discrete or continuous, such as policy gradient methods, random sampling, etc.), and/or other information. The action selection can optionally be constrained by the set of constraints. In a first example, only actions within the constraints can be selected. In a second example, only actions that do not result in an industrial system state can be selected (e.g., the industrial system is not predicted to transition into a constrained state or state outside of the constraints when the action is taken). However, the actions can be otherwise constrained. The industrial system implements the action and samples a new state (e.g., data for the next timestep), wherein the reinforcement learning agent observes the new state at the next timestep, calculates a cost based on the new state (e.g., the value of the objective function or output variable evaluated at the current timestep, etc.), and updates (e.g., retrains) the control policy. The control policy can be a neural net that takes in the current state as input and outputs the action (e.g., that encodes the likely local geometries of the probabilities of the objective functions of interest), a set of equations, and/or otherwise modeled. Optimizing the control policy can include: optimizing the neural network control policy, which can include iteratively updating the control policy until the expected cumulative cost of states over all time is minimized (e.g., wherein the expectation is taken with respect to the distribution over the sequence of sampled states and actions, or the trajectory); optimizing the control policy using gradient descent (e.g., using a scaled negative gradient update formula; optimizing the control policy using momentum (e.g., using a scaled exponential moving average of the gradients as the update formula); learning the update formula (e.g., learned using a neural network, wherein the update formula is parametrized as the weights of a neural network); and/or otherwise optimizing the control policy. In an example, this can include the method described in U.S. application Ser. No. 18/538,913 filed 13 Dec. 2023 or U.S. application Ser. No. 18/697,101 filed 29 Mar. 2024, each of which incorporated herein in its entirety by this method, but can be otherwise performed.

In a third variation, S300 includes: determining a set of component control models for each component within the industrial system representation; aggregating the set of component control model sets into an industrial system control model set; and optimizing the industrial system control model set (e.g., to minimize or maximize the output variable). In this variant, each template component can be associated with a predetermined component control model, which models how the component responds to a control instruction (e.g., action). The component control models (and the resultant industrial system control model set) preferably include a set of equations, but can alternatively be otherwise constructed. The industrial system control model set can be optimized using: gradient descent (e.g., using a scaled negative gradient update formula; momentum (e.g., using a scaled exponential moving average of the gradients as the update formula); and/or otherwise optimized.

However, S300 can be otherwise performed.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Optional elements, which can be included in some variants but not others, are indicated in broken lines in the figures.

As a person skilled in the art will recognize from the previous detailed description and from the figures and claims, modifications and changes can be made to the preferred embodiments of the invention without departing from the scope of this invention defined in the following claims.

We claim:

1. A method for industrial system management, comprising:
    determining a set of components collectively representing an industrial system, wherein each component of the set of components is pre-associated with a set of tags and a component control model;
    mapping each tag of each set of tags to a data stream from the industrial system;
    constructing a machine learning industrial system control model from the component control models associated with the set of the components, wherein each component control model comprises a physics model; wherein the machine learning industrial system control model is constructed from components of the physics models;
    training the machine learning industrial control model to predict control instructions using a set of training data, wherein the set of training data comprises a set of data associated with the industrial system variable set; and
    predicting a set of control instructions for the industrial system with the trained machine learning industrial control model using data from the tagged data streams.

2. The method of claim 1, wherein the set of components cooperatively form a graph.

3. The method of claim 1, wherein the machine learning industrial system control model comprises a reinforcement learning agent; wherein the reinforcement learning agent determines control instructions from the data streams of the industrial system according to a learned policy.

4. The method of claim 1, wherein the machine learning industrial system control model comprises:
    a set of local agents, each configured to determine a set of setpoints for an individual plant within the industrial system; and
    a centralized orchestrator, configured to balance load across the set of local agents.

5. The method of claim 4, wherein the centralized orchestrator determines a set of plant-level setpoints for each plant based on data from the set of local agents, and wherein each local agent determines a set of component-level setpoints for components within the respective plant based on data from the respective components.

6. The method of claim 1, wherein the set of tags for each component are generated using machine learning feature selection techniques.

7. The method of claim 1, wherein each physics model comprises a set of attributes; wherein constructing the machine learning industrial control model comprises aggregating the attributes into an input attribute set for the machine learning industrial system control model, wherein each attribute in the input attribute set is associated with a tag in the set of tags.

8. The method of claim 1, wherein the set of components is selected from a set of available components for an industrial system template for an industrial system type, wherein the industrial system template further comprises a predetermined control model, wherein the industrial system control model comprises the predetermined control model, and wherein the tags are determined based on the predetermined control model.

9. The method of claim 1, wherein each component of the set of components is pre-associated with a set of constraints, wherein the machine learning industrial system control model is constrained by the sets of constraints.

10. The method of claim 1, wherein the machine learning industrial system control model is trained on historical data from each data stream from the industrial system.

11. The method of claim 1, wherein each component of the set of components is pre-associated with a set of health rules and a set of data imputation rules, the method further comprising:
    validating each data stream based on the set of health rules for the component associated with the mapped tag; and
    for data stream segments that do not satisfy the set of health rules, imputing a new data stream segment using the set of data imputation rules for the component.

12. The method of claim 1, wherein each component of the set of components is associated with a set of machine learning features, the method further comprising:
    generating values for each set of machine learning features based on the data streams mapped to tags of the component; and
    generating the set of control instructions for the industrial system using the machine learning industrial system control model, based on the values for each set of machine learning features.

13. An industrial system management system, comprising:
    at least one processing system; and
    a non-transitory computer readable medium coupled to the at least one processing system, the non-transitory computer readable medium storing instructions that cause the at least one processing system to perform operations comprising:
        determining a set of components collectively representing an industrial system, wherein each component of the set of components is pre-associated with a set of machine learning features and a component control model;

associating each machine learning feature with a data stream from the industrial system;

generating a set of machine learning feature values for each machine learning feature based on the associated data stream; and generating a set of control instructions for the industrial system, using the machine learning feature values and a machine learning industrial system control model, wherein the machine learning industrial system control model is generated from the set of component control models; wherein the machine learning industrial system control model is trained to predict control instructions using a set of training data associated with the machine learning features of each component.

14. The system of claim 13, wherein the set of machine learning feature values comprise data values from the associated data stream.

15. The system of claim 13, wherein the industrial system control model comprises a reinforcement learning agent configured to learn a policy for selecting control instructions.

16. The system of claim 13, wherein each component of the set of components is pre-associated with a set of health rules and a set of data imputation rules, wherein the non-transitory computer readable medium further stores instructions that cause the at least one processing system to perform operations comprising:

validating each data stream based on the set of health rules for the component associated with the mapped tag; and for data stream segments that do not satisfy the set of health rules, imputing a new data stream segment using the set of data imputation rules for the component.

17. The system of claim 13, wherein the data streams associated with the machine learning features comprise a subset of data streams generated by the industrial system.

18. The system of claim 13, wherein the machine learning industrial system control model does not ingest all data streams generated by the industrial system when determining the set of control instructions.

19. The system of claim 13, wherein the machine learning features are predetermined using feature selection techniques.

20. The system of claim 13, wherein the machine learning industrial system control model ingests only a subset of all data streams generated by the industrial system when determining the set of control instructions.

* * * * *